(12) United States Patent
Victor-Faichney et al.

(10) Patent No.: US 12,400,414 B2
(45) Date of Patent: Aug. 26, 2025

(54) FACILITATING SYSTEM USER INTERFACE (UI) INTERACTIONS IN AN ARTIFICIAL REALITY (XR) ENVIRONMENT

(71) Applicant: Meta Platforms Technologies, LLC, Menlo Park, CA (US)

(72) Inventors: Anastasia Victor-Faichney, San Francisco, CA (US); Matthew Alan Insley, Seattle, WA (US); Samuel Matthew Levatich, Seattle, WA (US); Ahad Habib Basravi, Oakland, CA (US); Matthew Luther, Los Gatos, CA (US); Andrew C. Johnson, Somerville, MA (US); Matthaeus Krenn, Sunnyvale, CA (US); Difei Wang, Folsom, CA (US); Irvi Stefo, Brooklyn, NY (US); Norah Riley Smith, Oakland, CA (US)

(73) Assignee: Meta Platforms Technologies, LLC, Menlo Park, CA (US)

( * ) Notice: Subject to any disclaimer, the term of this patent is extended or adjusted under 35 U.S.C. 154(b) by 283 days.

(21) Appl. No.: 18/166,144

(22) Filed: Feb. 8, 2023

(65) Prior Publication Data

US 2024/0265656 A1 Aug. 8, 2024

(51) Int. Cl.
*G06T 19/20* (2011.01)
*G06F 3/01* (2006.01)
(52) U.S. Cl.
CPC .............. *G06T 19/20* (2013.01); *G06F 3/014* (2013.01); *G06T 2219/2016* (2013.01)
(58) Field of Classification Search
CPC .. G06T 19/20; G06T 2219/2016; G06F 3/014
See application file for complete search history.

(56) References Cited

U.S. PATENT DOCUMENTS 6,842,175 B1 1/2005 Schmalstieg et al.
7,701,439 B2 4/2010 Hillis et al.
(Continued)

FOREIGN PATENT DOCUMENTS

CN 106716332 A 5/2017
CN 108536273 A 9/2018
(Continued)

OTHER PUBLICATIONS

International Search Report and Written Opinion for International Application No. PCT/US2023/017990, mailed Jul. 10, 2023, 9 pages.

(Continued)

*Primary Examiner* — Xin Sheng
(74) *Attorney, Agent, or Firm* — Potomac Law Group, PLLC; Dannon G. Allbee

(57) ABSTRACT

A computer implemented method for facilitating system user interface (UI) interactions in an artificial reality (XR) environment is provided. The method includes rendering the system UI in the XR environment as a 3D virtual element. The method further includes tracking a position of a hand of a user and a pre-defined stable point on the user. The method further includes identifying, based on the tracking, that the hand has grasped a portion of the system UI and, in response, rotating the position of the system UI around the grasped portion of the system UI such that a line, between the stable point and the surface of the system UI, is moved, to be perpendicular or at a predefined angle from perpendicular to the surface of the system UI, as the user moves the system UI via the grasped portion.

17 Claims, 18 Drawing Sheets

(56) References Cited

U.S. PATENT DOCUMENTS

| | | |
|---|---|---|
| 8,558,759 B1 | 10/2013 | Prada Gomez et al. |
| 8,836,768 B1 | 9/2014 | Rafii et al. |
| 8,947,351 B1 | 2/2015 | Noble |
| 9,117,274 B2 | 8/2015 | Liao et al. |
| 9,292,089 B1 | 3/2016 | Sadek |
| 9,406,277 B1 | 8/2016 | Letourneur |
| 9,477,303 B2 | 10/2016 | Fleischmann et al. |
| 9,477,368 B1 | 10/2016 | Filip et al. |
| 9,817,472 B2 | 11/2017 | Lee et al. |
| 10,042,430 B2 | 8/2018 | Bedikian et al. |
| 10,187,936 B1 | 1/2019 | Letourneur |
| 10,220,303 B1 | 3/2019 | Schmidt et al. |
| 10,248,284 B2 | 4/2019 | Itani et al. |
| 10,318,100 B2 | 6/2019 | Abercrombie et al. |
| 10,473,935 B1 | 11/2019 | Gribetz et al. |
| 10,521,944 B2 | 12/2019 | Sareen et al. |
| 10,536,691 B2 | 1/2020 | Valdivia et al. |
| 10,595,011 B2 | 3/2020 | Han et al. |
| 10,607,413 B1 | 3/2020 | Marcolina et al. |
| 10,691,233 B2 | 6/2020 | Dalton et al. |
| 10,890,983 B2 | 1/2021 | Ravasz et al. |
| 10,956,724 B1 | 3/2021 | Terrano |
| 10,957,059 B1 | 3/2021 | Katz et al. |
| 11,079,753 B1 | 8/2021 | Roy |
| 11,221,730 B2 | 1/2022 | Murphy et al. |
| 11,307,671 B2 | 4/2022 | Liu et al. |
| 11,514,650 B2 | 11/2022 | Kim et al. |
| 11,991,222 B1 | 5/2024 | Walton et al. |
| 2004/0236541 A1 | 11/2004 | Kramer et al. |
| 2008/0089587 A1 | 4/2008 | Kim et al. |
| 2009/0077504 A1 | 3/2009 | Bell et al. |
| 2010/0306716 A1 | 12/2010 | Perez |
| 2011/0239155 A1 | 9/2011 | Christie |
| 2011/0267265 A1 | 11/2011 | Stinson |
| 2012/0069168 A1 | 3/2012 | Huang et al. |
| 2012/0071892 A1 | 3/2012 | Itkowitz et al. |
| 2012/0113223 A1 | 5/2012 | Hilliges et al. |
| 2012/0143358 A1 | 6/2012 | Adams et al. |
| 2012/0188279 A1 | 7/2012 | Demaine |
| 2012/0206345 A1 | 8/2012 | Langridge |
| 2012/0218183 A1 | 8/2012 | Givon et al. |
| 2012/0218395 A1 | 8/2012 | Andersen et al. |
| 2012/0249740 A1 | 10/2012 | Lee et al. |
| 2012/0249741 A1 | 10/2012 | MacIocci et al. |
| 2012/0275686 A1 | 11/2012 | Wilson et al. |
| 2012/0293544 A1 | 11/2012 | Miyamoto et al. |
| 2013/0063345 A1 | 3/2013 | Maeda |
| 2013/0125066 A1 | 5/2013 | Klein et al. |
| 2013/0147793 A1 | 6/2013 | Jeon et al. |
| 2013/0182902 A1 | 7/2013 | Holz |
| 2013/0265220 A1 | 10/2013 | Fleischmann et al. |
| 2014/0007484 A1 | 1/2014 | Erdoss et al. |
| 2014/0125598 A1 | 5/2014 | Cheng et al. |
| 2014/0204002 A1 | 7/2014 | Bennet et al. |
| 2014/0236996 A1 | 8/2014 | Masuko et al. |
| 2014/0306891 A1 | 10/2014 | Latta et al. |
| 2014/0357366 A1 | 12/2014 | Koganezawa et al. |
| 2014/0375691 A1 | 12/2014 | Kasahara |
| 2015/0035746 A1 | 2/2015 | Cockburn et al. |
| 2015/0040040 A1 | 2/2015 | Balan et al. |
| 2015/0054742 A1 | 2/2015 | Imoto et al. |
| 2015/0062160 A1 | 3/2015 | Sakamoto et al. |
| 2015/0110285 A1 | 4/2015 | Censo et al. |
| 2015/0153833 A1 | 6/2015 | Pinault et al. |
| 2015/0160736 A1 | 6/2015 | Fujiwara |
| 2015/0169076 A1 | 6/2015 | Cohen et al. |
| 2015/0178985 A1 | 6/2015 | Di Censo et al. |
| 2015/0181679 A1 | 6/2015 | Liao et al. |
| 2015/0206321 A1 | 7/2015 | Scavezze et al. |
| 2015/0220150 A1 | 8/2015 | Plagemann et al. |
| 2015/0243100 A1 | 8/2015 | Abovitz et al. |
| 2015/0261659 A1 | 9/2015 | Bader et al. |
| 2015/0269783 A1 | 9/2015 | Yun |
| 2016/0110052 A1 | 4/2016 | Kim et al. |
| 2016/0147308 A1 | 5/2016 | Gelman et al. |
| 2016/0170603 A1 | 6/2016 | Bastien et al. |
| 2016/0217614 A1 | 7/2016 | Kraver et al. |
| 2016/0378291 A1 | 12/2016 | Pokrzywka |
| 2017/0050542 A1 | 2/2017 | Shigeta et al. |
| 2017/0060230 A1 | 3/2017 | Faaborg et al. |
| 2017/0109936 A1 | 4/2017 | Powderly et al. |
| 2017/0139478 A1 | 5/2017 | Jeon et al. |
| 2017/0139481 A1 | 5/2017 | Long |
| 2017/0192513 A1 | 7/2017 | Karmon et al. |
| 2017/0206691 A1 | 7/2017 | Harrises et al. |
| 2017/0228130 A1 | 8/2017 | Palmaro |
| 2017/0262063 A1 | 9/2017 | Blenessy et al. |
| 2017/0263033 A1 | 9/2017 | Church |
| 2017/0278304 A1 | 9/2017 | Hildreth et al. |
| 2017/0287225 A1 | 10/2017 | Powderly et al. |
| 2017/0296363 A1 | 10/2017 | Yetkin et al. |
| 2017/0308166 A1 | 10/2017 | Mallinson |
| 2017/0329515 A1 | 11/2017 | Clement et al. |
| 2017/0337742 A1 | 11/2017 | Powderly et al. |
| 2017/0364198 A1 | 12/2017 | Yoganandan et al. |
| 2018/0004283 A1 | 1/2018 | Mathey-Owens et al. |
| 2018/0033204 A1 | 2/2018 | Dimitrov et al. |
| 2018/0039341 A1 | 2/2018 | Du Bois et al. |
| 2018/0046245 A1 | 2/2018 | Schwarz et al. |
| 2018/0059901 A1 | 3/2018 | Gullicksen |
| 2018/0107278 A1 | 4/2018 | Goel et al. |
| 2018/0113599 A1 | 4/2018 | Yin |
| 2018/0157398 A1 | 6/2018 | Kaehler et al. |
| 2018/0188816 A1 | 7/2018 | Liu et al. |
| 2018/0303446 A1 | 10/2018 | Schweizer |
| 2018/0307303 A1 | 10/2018 | Powderly et al. |
| 2018/0322701 A1 | 11/2018 | Pahud et al. |
| 2018/0323992 A1 | 11/2018 | Harms et al. |
| 2018/0329492 A1 | 11/2018 | Coppin et al. |
| 2018/0335925 A1 | 11/2018 | Hsiao et al. |
| 2018/0357780 A1 | 12/2018 | Young et al. |
| 2019/0018498 A1 | 1/2019 | West et al. |
| 2019/0050071 A1 | 2/2019 | Liu et al. |
| 2019/0057531 A1 | 2/2019 | Sareen et al. |
| 2019/0094981 A1 | 3/2019 | Bradski et al. |
| 2019/0107894 A1 | 4/2019 | Hebbalaguppe et al. |
| 2019/0120593 A1 | 4/2019 | Randles |
| 2019/0129607 A1 | 5/2019 | Saurabh et al. |
| 2019/0130653 A1 | 5/2019 | Kuehne |
| 2019/0138107 A1 | 5/2019 | Nietfeld et al. |
| 2019/0146599 A1 | 5/2019 | Gunnarsson et al. |
| 2019/0213792 A1 | 7/2019 | Jakubzak et al. |
| 2019/0258318 A1 | 8/2019 | Qin et al. |
| 2019/0265828 A1 | 8/2019 | Hauenstein et al. |
| 2019/0278376 A1 | 9/2019 | Kutliroff et al. |
| 2019/0279424 A1 | 9/2019 | Clausen et al. |
| 2019/0286231 A1 | 9/2019 | Burns et al. |
| 2019/0290999 A1 | 9/2019 | Bradner et al. |
| 2019/0318640 A1 | 10/2019 | Goel et al. |
| 2019/0325651 A1 | 10/2019 | Bradner et al. |
| 2019/0347865 A1 | 11/2019 | Hackett et al. |
| 2019/0361521 A1 | 11/2019 | Stellmach et al. |
| 2019/0362562 A1 | 11/2019 | Benson |
| 2019/0369391 A1 | 12/2019 | Cordesses et al. |
| 2019/0377416 A1 | 12/2019 | Alexander |
| 2019/0391710 A1 | 12/2019 | Shen |
| 2020/0001172 A1 | 1/2020 | Nicoli |
| 2020/0012341 A1 | 1/2020 | Stellmach et al. |
| 2020/0082629 A1 | 3/2020 | Jones et al. |
| 2020/0097077 A1 | 3/2020 | Nguyen et al. |
| 2020/0097091 A1 | 3/2020 | Chou et al. |
| 2020/0129850 A1 | 4/2020 | Ohashi |
| 2020/0159337 A1 | 5/2020 | Kin et al. |
| 2020/0218423 A1 | 7/2020 | Ohashi |
| 2020/0225736 A1 | 7/2020 | Schwarz et al. |
| 2020/0225757 A1 | 7/2020 | Schwarz et al. |
| 2020/0225758 A1 | 7/2020 | Tang et al. |
| 2020/0225813 A1 | 7/2020 | Schwarz et al. |
| 2020/0225830 A1 | 7/2020 | Tang et al. |
| 2020/0226814 A1 | 7/2020 | Tang et al. |
| 2020/0286299 A1 | 9/2020 | Wang et al. |
| 2020/0379576 A1 | 12/2020 | Chen et al. |
| 2020/0387228 A1 | 12/2020 | Ravasz et al. |
| 2020/0387287 A1 | 12/2020 | Ravasz et al. |

(56) References Cited

U.S. PATENT DOCUMENTS

| | | | |
|---|---|---|---|
| 2020/0388247 | A1 | 12/2020 | Ravasz et al. |
| 2021/0076091 | A1 | 3/2021 | Shohara |
| 2021/0096726 | A1 | 4/2021 | Faulkner et al. |
| 2021/0134065 | A1 | 5/2021 | Ramani et al. |
| 2021/0141461 | A1 | 5/2021 | Liu et al. |
| 2021/0183135 | A1 | 6/2021 | Lin et al. |
| 2021/0208698 | A1 | 7/2021 | Martin et al. |
| 2021/0373672 | A1 | 12/2021 | Schwarz et al. |
| 2022/0084279 | A1 | 3/2022 | Lindmeier et al. |
| 2022/0121344 | A1 | 4/2022 | Pastrana Vicente et al. |
| 2022/0156999 | A1 * | 5/2022 | Assouline ............ G06T 19/006 |
| 2022/0163800 | A1 | 5/2022 | Yokokawa |
| 2022/0198755 | A1 | 6/2022 | Pinchon |
| 2022/0244834 | A1 | 8/2022 | Ravasz et al. |
| 2022/0262080 | A1 | 8/2022 | Burton et al. |
| 2023/0031913 | A1 | 2/2023 | Ishikawa et al. |
| 2023/0040610 | A1 | 2/2023 | Buerli et al. |
| 2023/0072423 | A1 | 3/2023 | Osborn et al. |
| 2023/0139337 | A1 | 5/2023 | Noam et al. |
| 2023/0274512 | A1 | 8/2023 | Terre et al. |
| 2023/0343052 | A1 | 10/2023 | Kimura et al. |
| 2024/0019938 | A1 | 1/2024 | Whitmire et al. |
| 2024/0028129 | A1 | 1/2024 | Whitmire et al. |
| 2024/0264660 | A1 | 8/2024 | Levatich et al. |
| 2024/0281070 | A1 | 8/2024 | Emami et al. |
| 2024/0281071 | A1 | 8/2024 | Emami et al. |
| 2024/0372901 | A1 | 11/2024 | Walton et al. |
| 2025/0054243 | A1 | 2/2025 | Selig et al. |
| 2025/0068297 | A1 | 2/2025 | Selig et al. |

FOREIGN PATENT DOCUMENTS

| | | | | |
|---|---|---|---|---|
| CN | 110134234 | B * | 5/2022 | ............ G06F 3/011 |
| CN | 116339737 | A | 6/2023 | |
| EP | 3155560 | A1 | 4/2017 | |
| EP | 3155560 | B1 | 5/2020 | |
| EP | 4145397 | A1 | 3/2023 | |
| JP | 2015100032 | A | 5/2015 | |
| JP | 2015176439 | A | 10/2015 | |
| JP | 2015192436 | A | 11/2015 | |
| JP | 2017529635 | A | 10/2017 | |
| KR | 20120136719 | A | 12/2012 | |
| WO | 2014119258 | A1 | 8/2014 | |
| WO | 2015192117 | A1 | 12/2015 | |
| WO | 2017009707 | A1 | 1/2017 | |
| WO | 2018067508 | A1 | 4/2018 | |
| WO | 2018235371 | A1 | 12/2018 | |
| WO | 2019245681 | A1 | 12/2019 | |
| WO | WO-2022146938 | A1 * | 7/2022 | ............ G06F 3/011 |

OTHER PUBLICATIONS

Fox B., et al., "Designing Singlehanded Shortcuts for VR & AR," May 10, 2018, Retrieved from the Internet: URL: https://www.roadtovr.com/leap-motion-designing-single-handed-shortcuts-for-vr-ar/, [Retrieved on Oct. 27, 2020], 18 pages.
Huang Y., et al., "Evaluation of a Hybrid of Hand Gesture and Controller Inputs in Virtual Reality," International Journal of Human-Computer Interaction, Aug. 26, 2020, vol. 37, No. 2, pp. 169-180.
International Search Report and Written Opinion of International Application No. PCT/US2020/035998, mailed Sep. 30, 2020, 16 pages.
Lang B., "Leap Motion Virtual Wearable AR Prototype is a Potent Glimpse at the Future of Your Smartphone," Mar. 24, 2018, Retrieved from the Internet: URL: https://www.roadtovr.com/leap-motion-virtual-wearable-ar-prototype-glimpse-of-future-smartphone/, [Retrieved on Oct. 27, 2020], 6 pages.
Matsuda K., "Augmented City 3D [Official]," YouTube, Aug. 20, 2010, Retrieved from the Internet: URL: https://www.youtube.com/watch?v=3TL80ScTLIM, 1 page.
Newton A., "Immersive Menus Demo," YouTube, Oct. 8, 2017, Retrieved from the Internet: URL: https://www.youtube.com/watch?v=_ow1RboHJDY, 1 page.
Office Action mailed Sep. 19, 2023 for European Patent Application No. 20747255.6, filed on Dec. 7, 2021, 6 pages.
Office Action mailed Feb. 27, 2024 for Chinese Application No. 202080035337.X, filed Jun. 3, 2020, 8 pages.
Prosecution History of U.S. Appl. No. 16/434,919, dated Apr. 2, 2020 through Dec. 15, 2020, 46 pages.
Argelaguet F., et al., "A Survey of 3D Object Selection Techniques for Virtual Environments," Computers & Graphics,2013, vol. 37, No. 3, pp. 121-136.
Cardoso J., Comparison of Gesture, Gamepad, and Gaze-Based Locomotion for VR Worlds, Proceedings of the 22nd ACM Conference on Virtual Reality Software and Technology, Nov. 2, 2016, pp. 319-320.
Hincapie-Ramos J.D., et aL, "GyroWand: IMU-Based Raycasting for Augmented Reality Head-Mounted Displays," Proceedings of the 3rd Association for Computing Machinery (ACM) Symposium on Spatial User Interaction, Los Angeles, CA, USA, Aug. 8-9, 2015, pp. 89-98.
International Preliminary Report on Patentability for International Application No. PCT/US2020/051763, mailed Mar. 31, 2022, 10 pages.
International Search Report and Written Opinion for International Application No. PCT/US2020/051763, mailed Feb. 3, 2021, 11 Pages.
International Search Report and Written Opinion for International Application No. PCT/US2021/063536 mailed Mar. 22, 2022, 12 pages.
Lee M.S., et al., "A Computer Vision System for on-Screen Item Selection by Finger Pointing," In Proceedings of the 2001 IEEE Computer Society Conference on Computer Vision and Pattern Recognition (CVPR), 2001, vol. 1, 8 pages.
Mardanbegi D., et al., "Eyesee Through: Unifying Tool Selection and Application in Virtual Environments," In 2019 IEEE Conference on Virtual Reality and 3D User Interfaces (VR), 2019, pp. 474-483.
Mayer S., et al., "The Effect of Offset Correction and Cursor on Mid-Air Pointing in Real and Virtual Environments," Proceedings of the 2018 CHI Conference on Human Factors in Computing Systems, Montreal, QC, Canada, Apr. 21-26, 2018, pp. 1-13.
Mine M.R., et al., Moving Objects in Space: Exploiting Proprioception in Virtual-Environment Interaction, In Proceedings of the 24th Annual Conference on Computer Graphics and Interactive Techniques, 1997, pp. 19-26.
Olwal A., et al., "The Flexible Pointer: An Interaction Technique for Selection in Augmented and Virtual Reality," Proceedings of ACM Symposium on User Interface Software and Technology (UIST), Vancouver, BC, Nov. 2-5, 2003, pp. 81-82.
Pfeuffer, et al., "Gaze+ Pinch Interaction in Virtual Reality," ACM, 2017, SUI '17, Brighton, United Kingdom, Oct. 16, 2017, 10 pages.
Renner P., et al., "Ray Casting", Central Facility Labs [Online], [Retrieved on Apr. 7, 2020], 2 pages, Retrieved from the Internet: URL:https://www.techfak.uni-bielefeld.de/~tpfeiffe/lehre/VirtualReality/interaction/ray_casting.html.
Schweigert R., et aL, "EyePointing: A Gaze-Based Selection Technique," Proceedings of Mensch and Computer, Hamburg, Germany, Sep. 8-11, 2019, pp. 719-723.
Tomberlin M., et al., "Gauntlet: Travel Technique for Immersive Environments using Non-Dominant Hand," IEEE Virtual Reality (VR), Mar. 18, 2017, pp. 299-300.
Unity Gets Toolkit for Common AR/VR Interactions, Unity XR interaction Toolkit Preview [Online], Dec. 19, 2019 Retrieved on Apr. 7, 2020], 1 page, Retrieved from the Internet: URL: http://youtu.be/ZPhv4qmT9EQ.
European Search Report for European Patent Application No. 24154976.5, dated Jun. 7, 2024, 8 pages.
European Search Report for European Patent Application No. 24155225.6, dated May 2, 2024, 10 pages.
International Search Report and Written Opinion for International Application No. PCT/US2024/036906, mailed Oct. 17, 2024, 14 pages.
International Search Report and Written Opinion for International Application No. PCT/US2024/040999, mailed Dec. 2, 2024, 10 pages.

(56) References Cited

OTHER PUBLICATIONS

Office Action mailed Apr. 9, 2024 for Japanese Patent Application No. 2021-555497, filed on Jun. 3, 2020, 4 pages.

* cited by examiner

FACILITATING SYSTEM USER INTERFACE (UI) INTERACTIONS IN AN ARTIFICIAL REALITY (XR) ENVIRONMENT

CROSS-REFERENCE TO RELATED APPLICATIONS

This application is related to U.S. application Ser. No. 18/166,163, titled "Facilitating System User Interface (UI) Interactions in an Artificial Reality (XR) Environment," filed Feb. 8, 2023; U.S. application Ser. No. 18/166,282, titled "Facilitating User Interface Interactions in an Artificial Reality Environment," filed Feb. 8, 2023; and to U.S. application Ser. No. 18/166,258, titled "Intent-Based User Interface Modifications in an Artificial Reality Environment," filed Feb. 8, 2023, all of which are herein incorporated by reference in their entirety.

TECHNICAL FIELD

The present disclosure is directed to facilitating interactions with a system user interface (UI) in an artificial reality (XR) environment. More specifically, the present disclosure relates to systems and methods for handling or operating the system UI, rendered in the XR environment.

BACKGROUND

Recent advancements in the field of artificial reality (XR) technology have led to development of various artificial reality platforms e.g., for user assistance and entertainment. Artificial reality content may include video, audio, haptic feedback, or some combination thereof, and any of which may be presented in a single channel or in multiple channels. Artificial reality can provide social connection where users may be able to virtually connect with friends in an artificial environment, travel through space and time, play games in a completely new way, etc.

Conventional XR environments enable users to view content in various forms, such as the virtual objects. However, interacting with a virtual object, such as a screen, in the XR environment may be a complex task. For example, the screen may be fixed at a defined distance in the XR environment. Such a fixed screen may be difficult to access or perform fine grained interactions with. Moreover, a size of the screen may be small and the content on the screen may not be clearly visible by the user. Thus, the experience of using the virtual objects, such as the screen in conventional XR environments may be unsatisfactory and difficult for the users.

BRIEF DESCRIPTION OF THE DRAWINGS

The techniques introduced here may be better understood by referring to the following Detailed Description in conjunction with the accompanying drawings, in which like reference numerals indicate identical or functionally similar elements.

DETAILED DESCRIPTION

Figure 1:
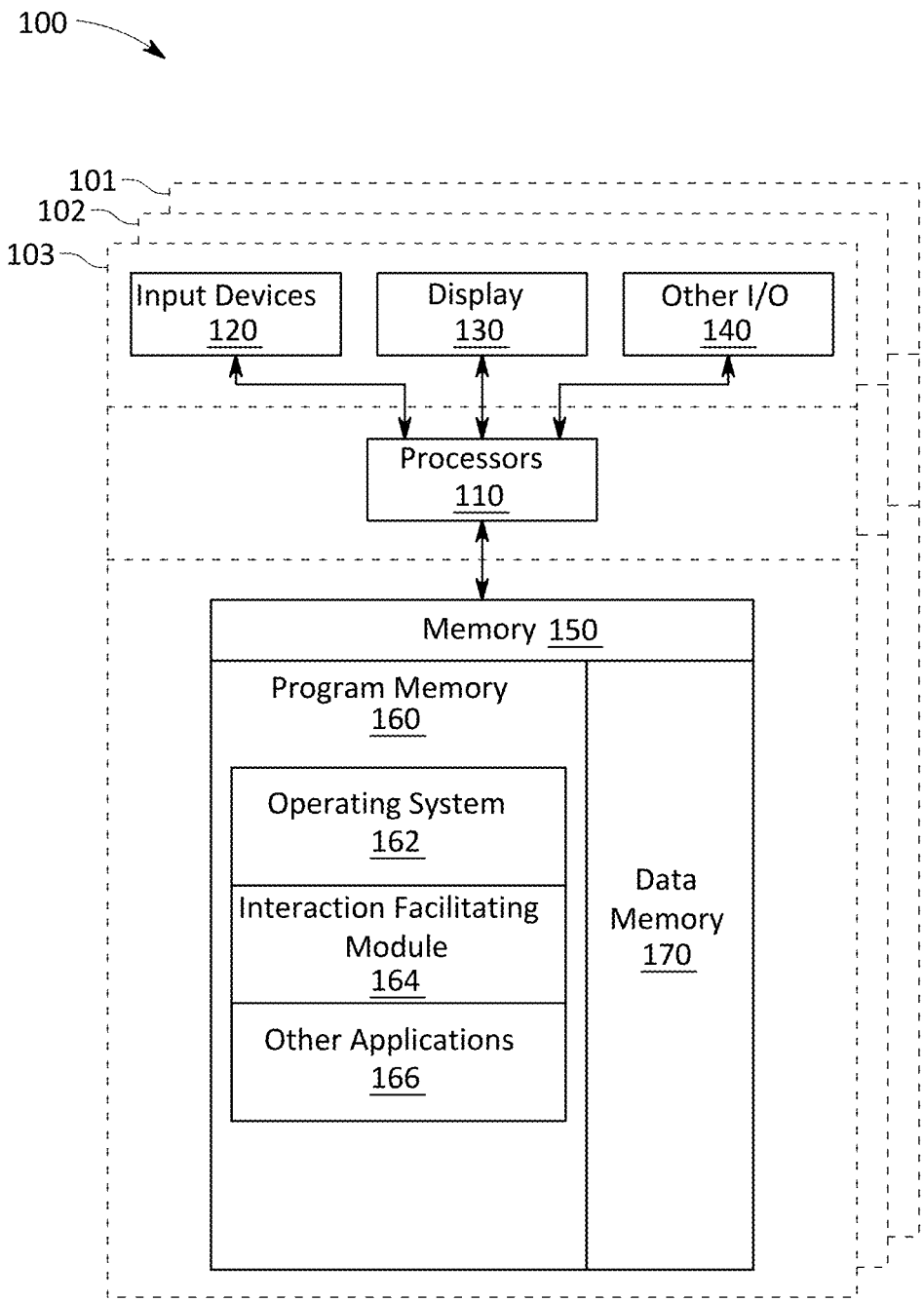
FIG. 1 is a block diagram illustrating an overview of devices on which some implementations of the present technology can operate.

Aspects of the present disclosure are directed to facilitating interactions with a system user interface (UI) in an artificial reality (XR) environment. An interaction facilitation system may be provided to facilitate the system UI interactions in the XR environment. A system user interface (UI) may be rendered in the XR environment, in order to facilitate interaction between a user and the system UI, e.g., for providing system controls and settings, showing notifications, providing access to applications built for 2D display systems, providing interfaces to people and social interactions, etc.

The interaction facilitation system may be configured to render the system UI as a 3D virtual element in the XR environment, and track a position of a user in a real world environment. Based on the tracking, the interaction facilitation system may rotate the system UI in the XR environment, similar to a rotation of a device in the real world environment. Furthermore, the interaction facilitation system may be configured to change an input mode for interaction with the system UI, from a ray casting mode of interaction to a direct touch mode of interaction and vice versa based on a distance of the system UI from the user. The interaction facilitation system may be further configured to modify the system UI having a single screen display to a multi-screen display and vice versa, based on the changed distance and/or input mode.

In an exemplary scenario, a user may utilize the XR environment for different applications, for example, entertainment, healthcare, automotive, education development, social and relationship connections, etc. The system UI may be utilized as a medium to access various applications, such as viewing content, browsing internet, connecting with other users, accessing system controls, and so forth in the XR environment. The interaction facilitating system may receive an input, from the user via an XR device, to open the system UI. The interaction facilitating system can render the system UI in the XR environment based on the received input. Furthermore, the interaction facilitating system can track the position of a hand of the user and a pre-defined stable point on the user. For example, the stable point of the user may be determined based on a point where a base of the user's head meets the user's neck. The tracking may be performed to determine the actual position and/or gestures of the hand of the user in the real world environment.

In an implementation, the user may perform the gesture of moving the hand close to the system UI (e.g., to grab and rotate the system UI). Based on a determination that the tracked position of the user's hand has grasped a portion of the system UI and the user needs to rotate the system UI, the interaction facilitating system may rotate the position of the system UI around the grasped portion of the system UI. Moreover, the system UI, is moved such that a line (which may not be displayed), between the stable point and the surface of the system UI, to be to keep the line either perpendicular or at a predefined angle from perpendicular to the surface of the system UI, e.g., as the user moves or rotates the system UI via the grasped portion in the XR environment. For example, the user can grasp and move the system UI in a vertical direction and also rotate the system UI via the grasped portion of the system UI, while the interaction facilitation system keeps the system UI surface pointed toward the user by maintaining the line as perpendicular to the system UI surface. Thus, the interaction facilitating system moves and/or rotates the system UI such that the surface of the system UI remains towards eyes of the user, when user moves or rotates the system UI in the XR environment.

In another implementation, the interaction facilitating system may further switch input modes of the system UI based on a distance of the user from the system UI. For example, based on a determination that the distance between the user and the system UI is below a first threshold, the interaction facilitating system may change the input mode of interaction from ray casting to a direct touch mode of interaction in which a representation of the hand of the user is rendered in the XR environment. For example, when the distance between the hand of the user and the system UI is below the first threshold (e.g., inside a distance of a determined typical arm length or a determined length of the arm of the current user), the input mode may be changed to the direct touch mode of interaction in which the user can view the representation of the hand interacting with the system UI. Such direct touch mode of interaction gives an impression of directly touching the system UI in the XR environment, similar to touching and accessing a device in the real world environment. Moreover, in such a case, an appearance of the system UI is modified to have a flat shape and may include the single screen display. Moreover, an appearance of a set of UI elements of the system UI is modified to have a three-dimensional shape and a fixed size. Thus, the set of UI elements may appear to partially extend above a plane of the system UI surface, making it easier for the user to understand and interact with controls on the system UI and further provides an enhanced viewing experience to the user.

Furthermore, based on a determination that the distance between the user and the system UI is above a second threshold (which may also be based on a determined length of a typical arm or a determined length of the arm of the current user), the computing system may change the input mode of interaction from the direct touch to the ray casting mode of interaction, in which a virtual line is rendered under the user's control (e.g., based on the user's hand or controller position) that interacts with the set of UI elements. For example, the when the distance between the hand of the user and the system UI is above the second threshold, the input mode may be changed to the ray casting mode of interaction in which the user can view the virtual line (such as a ray or a ray with a pointer) interacting with the system UI. Such ray casting mode of interaction gives an ability to interact with the system UI from a distance in the XR environment. In such a case, the appearance of the system UI can be modified to have a curved shape and may include the multi-screen display. Moreover, the appearance of the set of UI elements of the system UI can be modified to have a two-dimensional shape and a relative size. Moreover, the first threshold may be closer than the second threshold. Thus, the interaction facilitating system enables switching between the input modes to be a smooth and a glitch free experience for the user.

Embodiments of the disclosed technology may include or be implemented in conjunction with an artificial reality system. Artificial reality or extra reality (XR) is a form of reality that has been adjusted in some manner before presentation to a user, which may include, e.g., virtual reality (VR), augmented reality (AR), mixed reality (MR), hybrid reality, or some combination and/or derivatives thereof. Artificial reality content may include completely generated content or generated content combined with captured content (e.g., real-world photographs). The artificial reality content may include video, audio, haptic feedback, or some combination thereof, any of which may be presented in a single channel or in multiple channels (such as stereo video that produces a three-dimensional effect to the viewer). Additionally, in some embodiments, artificial reality may be associated with applications, products, accessories, services, or some combination thereof, that are, e.g., used to create content in an artificial reality and/or used in (e.g., perform activities in) an artificial reality. The artificial reality system that provides the artificial reality content may be implemented on various platforms, including a head-mounted display (HMD) connected to a host computer system, a standalone HMD, a mobile device or computing system, a "cave" environment or other projection system, or any other hardware platform capable of providing artificial reality content to one or more viewers.

"Virtual reality" or "VR," as used herein, refers to an immersive experience where a user's visual input is controlled by a computing system. "Augmented reality" or "AR" refers to systems where a user views images of the real world after they have passed through a computing system. For example, a tablet with a camera on the back can capture images of the real world and then display the images on the screen on the opposite side of the tablet from the camera. The tablet can process and adjust or "augment" the images as they pass through the system, such as by adding virtual objects. "Mixed reality" or "MR" refers to systems where light entering a user's eye is partially generated by a computing system and partially composes light reflected off objects in the real world. For example, a MR headset could be shaped as a pair of glasses with a pass-through display, which allows light from the real world to pass through a waveguide that simultaneously emits light from a projector in the MR headset, allowing the MR headset to present virtual objects intermixed with the real objects the user can see. "Artificial reality," "extra reality," or "XR," as used herein, refers to any of VR, AR, MR, or any combination or hybrid thereof.

The term "system user interface (UI)," as used herein, refers to a virtual user interface (UI) that allows users to interact with virtual objects, environments, or information in the physical or virtual space. The system UI may include a set of UI elements or feature elements that may be used to features and controls such as system settings for the artificial reality device, system notifications, XR navigation controls, flat-panel applications (e.g., android or iOS apps, web browser or messaging interfaces, etc.), social media platform interfaces, etc. The system UI may be a migrating UI (for example, similar to an electronic tablet in physical world), such that it can be moved from one position to another position in the XR environment with respect to the user in some cases, while in others it may be world locked or locked to a particular area of the user's field of view. The system UI may be a 2-dimensional (2D) UI or a 3-dimensional (3D) UI.

Conventional XR systems enable a user to interact in the environments, for example, with virtual objects. However, interacting with virtual object, such as a system user interface (UI) in the XR environment may be a complex task for the users. For example, the user may find it difficult to interact with the system UI in the XR environment, since there may be limited haptic feedback, the system UI may be fixed at an undesirable distance in the XR environment, movement of the system UI may be limited, or providing inputs to UI elements of the system UI may be difficult. Thus, the user experiences, using the conventional systems, of interaction and control of the virtual objects, such as the system UI, are unsatisfactory.

In order to improve the interaction and control of the system UI in the XR environment compared to the conventional systems, the interaction facilitation system of the present disclosure provides an improved interaction model for the system UI. For example, the interaction facilitation system enables tracking of a position of the user, such as a hand, head or an eye level of the user, based on the tracking, determines a stable point that is personalized for each user, and rotates the system UI based on the stable point. Thus, as the user moves system UI in the XR environment a rotation is achieved that facilitates user viewing and interacting with the system UI. Further, for moving or rotating the system UI in the XR environment, the interaction facilitation system identifies a portion of the system UI that is grasped by the user, and rotates the system UI from the grasped portion. Such a rotation provides the user a similar experience as that of rotating or moving a device in the real world environment. By performing rotation of the system UI in such a manner that the surface of the system UI faces towards the user angle of the system UI surface may be comfortably viewed by the user in the XR environment. Moreover, the interaction facilitation system enables switching of the input mode and display modes of the system UI based on a distance of the user from the system UI. The switching between the input modes enables a smooth experience for the user at various distances for different purposes.

Several implementations are discussed below in more detail in reference to the figures. FIG. 1 is a block diagram illustrating an overview of devices on which some implementations of the disclosed technology can operate. The devices can comprise hardware components of a computing system 100 that are configured to facilitate system user interface (UI) interactions in an artificial reality (XR) environment. In various implementations, computing system 100 can include a single computing device 103 or multiple computing devices (e.g., computing device 101, computing device 102, and computing device 103) that communicate over wired or wireless channels to distribute processing and share input data. In some implementations, computing system 100 can include a stand-alone headset capable of providing a computer created or augmented experience for a user without the need for external processing or sensors. In other implementations, computing system 100 can include multiple computing devices such as a headset and a core processing component (such as a console, mobile device, or server system) where some processing operations are performed on the headset and others are offloaded to the core processing component. Example headsets are described below in relation to FIGS. 2A and 2B. In some implementations, position and environment data can be gathered only by sensors incorporated in the headset device, while in other implementations one or more of the non-headset computing devices can include sensor components that can track environment or position data.

Computing system 100 can include one or more processor(s) 110 (e.g., central processing units (CPUs), graphical processing units (GPUs), holographic processing units (HPUs), etc.) Processors 110 can be a single processing unit or multiple processing units in a device or distributed across multiple devices (e.g., distributed across two or more of computing devices 101-103).

Computing system 100 can include one or more input devices 120 that provide input to the processors 110, notifying them of actions. The actions can be mediated by a hardware controller that interprets the signals received from the input device and communicates the information to the processors 110 using a communication protocol. Each input device 120 can include, for example, a mouse, a keyboard, a touchscreen, a touchpad, a wearable input device (e.g., a haptics glove, a bracelet, a ring, an earring, a necklace, a watch, etc.), a camera (or other light-based input device, e.g., an infrared sensor), a microphone, or other user input devices.

Processors 110 can be coupled to other hardware devices, for example, with the use of an internal or external bus, such as a PCI bus, SCSI bus, or wireless connection. The processors 110 can communicate with a hardware controller for devices, such as for a display 130. Display 130 can be used to display text and graphics. In some implementations, display 130 includes the input device as part of the display, such as when the input device is a touchscreen or is equipped with an eye direction monitoring system. In some implementations, the display is separate from the input device. Examples of display devices are: an LCD display screen, an LED display screen, a projected, holographic, or augmented reality display (such as a heads-up display device or a head-mounted device), and so on. Other I/O devices 140 can also be coupled to the processor, such as a network chip or card, video chip or card, audio chip or card, USB, firewire or other external device, camera, printer, speakers, CD-ROM drive, DVD drive, disk drive, etc.

In some implementations, input from the I/O devices 140, such as cameras, depth sensors, IMU sensor, GPS units, LiDAR or other time-of-flights sensors, etc. can be used by the computing system 100 to identify and map the physical environment of the user while tracking the user's location within that environment. This simultaneous localization and mapping (SLAM) system can generate maps (e.g., topologies, girds, etc.) for an area (which may be a room, building, outdoor space, etc.) and/or obtain maps previously generated by computing system 100 or another computing system that had mapped the area. The SLAM system can track the user within the area based on factors such as GPS data, matching identified objects and structures to mapped objects and structures, monitoring acceleration and other position changes, etc.

Computing system 100 can include a communication device capable of communicating wirelessly or wire-based with other local computing devices or a network node. The communication device can communicate with another device or a server through a network using, for example, TCP/IP protocols. Computing system 100 can utilize the communication device to distribute operations across multiple network devices.

The processors 110 can have access to a memory 150, which can be contained on one of the computing devices of computing system 100 or can be distributed across of the multiple computing devices of computing system 100 or other external devices. A memory includes one or more hardware devices for volatile or non-volatile storage, and can include both read-only and writable memory. For example, a memory can include one or more of random access memory (RAM), various caches, CPU registers, read-only memory (ROM), and writable non-volatile memory, such as flash memory, hard drives, floppy disks, CDs, DVDs, magnetic storage devices, tape drives, and so forth. A memory is not a propagating signal divorced from underlying hardware; a memory is thus non-transitory. Memory 150 can include program memory 160 that stores programs and software, such as an operating system 162, an interaction facilitating module 164, and other application programs 166. Memory 150 can also include data memory 170 that can include, e.g., the user tracking data, configuration data, settings, user options or preferences, etc., configuration data, settings, user options or preferences, etc., which can be provided to the program memory 160 or any element of the computing system 100.

The interaction facilitating module 164 may be configured to facilitate interaction between the user and the system UI in the XR environment. To facilitate the interaction between the system UI and the user, the interaction facilitating module 164 may perform various functions such as rendering the system UI in the XR environment, tracking a position of a hand of the user and a pre-defined stable point on the user, and identifying that the hand of the user has grasped a portion of the system UI. Based on the identification, the interaction facilitating module 164 may rotate the position of the system UI around the grasped portion of the system UI. For example, the rotation may be such that a line, between the stable point and the surface of the system UI, is moved, to be perpendicular or at a predefined angle from perpendicular to the surface of the system UI, as the user moves the system UI via the grasped portion.

Furthermore, the interaction facilitating module 164 may determine a distance between the user and the system UI, based on the tracked position of the user. In response to determination that the distance is below a first threshold, the interaction facilitating module 164 may change an input mode of interaction between the user and the system UI, from a ray casting mode of interaction to a direct touch mode of interaction. The direct touch mode of interaction enables the system UI to be accessed by the user from a close distance, similar to accessing a device by hands in the real world environment. The interaction facilitating module 164 may further modify the appearance of the system UI to have a flat shape, and modify the appearance of one or more of the set of UI elements to have a three-dimensional shape and to be a fixed size.

Moreover, in response to determining that the distance between the user and the system UI is above a second threshold, the interaction facilitating module 164 may change the input mode of interaction between the user and the system UI, from the direct touch mode of interaction to the ray casting mode of interaction. The ray casting mode of interaction enables the system UI to be accessed by the user from a far distance. The interaction facilitating module 164 may further modify the appearance of the system UI to have a curved shape, and modify the appearance of one or more of the set of UI elements to have a two-dimensional shape and to be a relative size.

Some implementations can be operational with numerous other computing system environments or configurations. Examples of computing systems, environments, and/or configurations that may be suitable for use with the technology include, but are not limited to, XR headsets, personal computers, server computers, handheld or laptop devices, cellular telephones, wearable electronics, gaming consoles, tablet devices, multiprocessor systems, microprocessor-based systems, set-top boxes, programmable consumer electronics, network PCs, minicomputers, mainframe computers, distributed computing environments that include any of the above systems or devices, or the like.

Figure 2A:
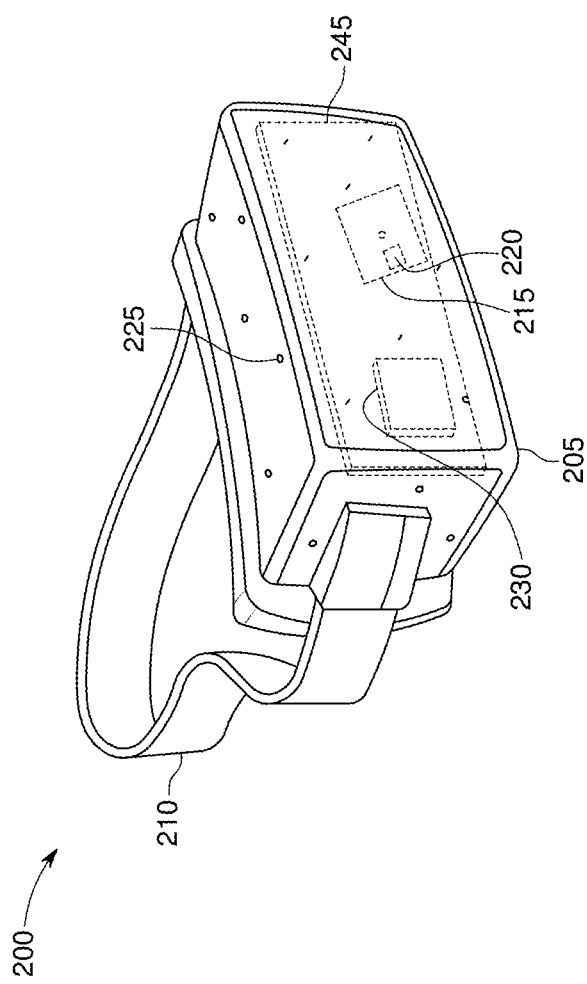
FIG. 2A is a wire diagram illustrating a virtual reality headset which can be used in some implementations of the present technology.

FIG. 2A is a wire diagram of a virtual reality head-mounted display (HMD) 200, in accordance with some embodiments. The HMD 200 includes a front rigid body 205 and a band 210. The front rigid body 205 includes one or more electronic display elements of an electronic display 245, an inertial motion unit (IMU) 215, one or more position sensors 220, locators 225, and one or more compute units 230. The position sensors 220, the IMU 215, and compute units 230 may be internal to the HMD 200 and may not be visible to the user. In various implementations, the IMU 215, position sensors 220, and locators 225 can track movement and location of the HMD 200 in the real world and in an artificial reality environment in three degrees of freedom (3DoF) or six degrees of freedom (6DoF). For example, the locators 225 can emit infrared light beams which create light points on real objects around the HMD 200. As another example, the IMU 215 can include e.g., one or more accelerometers, gyroscopes, magnetometers, other non-camera-based position, force, or orientation sensors, or combinations thereof. One or more cameras (not shown) integrated with the HMD 200 can detect the light points. Compute units 230 in the HMD 200 can use the detected light points to extrapolate position and movement of the HMD 200 as well as to identify the shape and position of the real objects surrounding the HMD 200.

The electronic display 245 can be integrated with the front rigid body 205 and can provide image light to a user as dictated by the compute units 230. In various embodiments, the electronic display 245 can be a single electronic display or multiple electronic displays (e.g., a display for each user eye). Examples of the electronic display 245 include: a liquid crystal display (LCD), an organic light-emitting diode (OLED) display, an active-matrix organic light-emitting diode display (AMOLED), a display including one or more quantum dot light-emitting diode (QOLED) sub-pixels, a projector unit (e.g., microLED, LASER, etc.), some other display, or some combination thereof.

In some implementations, the HMD 200 can be coupled to a core processing component such as a personal computer (PC) (not shown) and/or one or more external sensors (not shown). The external sensors can monitor the HMD 200 (e.g., via light emitted from the HMD 200) which the PC can use, in combination with output from the IMU 215 and position sensors 220, to determine the location and movement of the HMD 200.

Figure 2B:
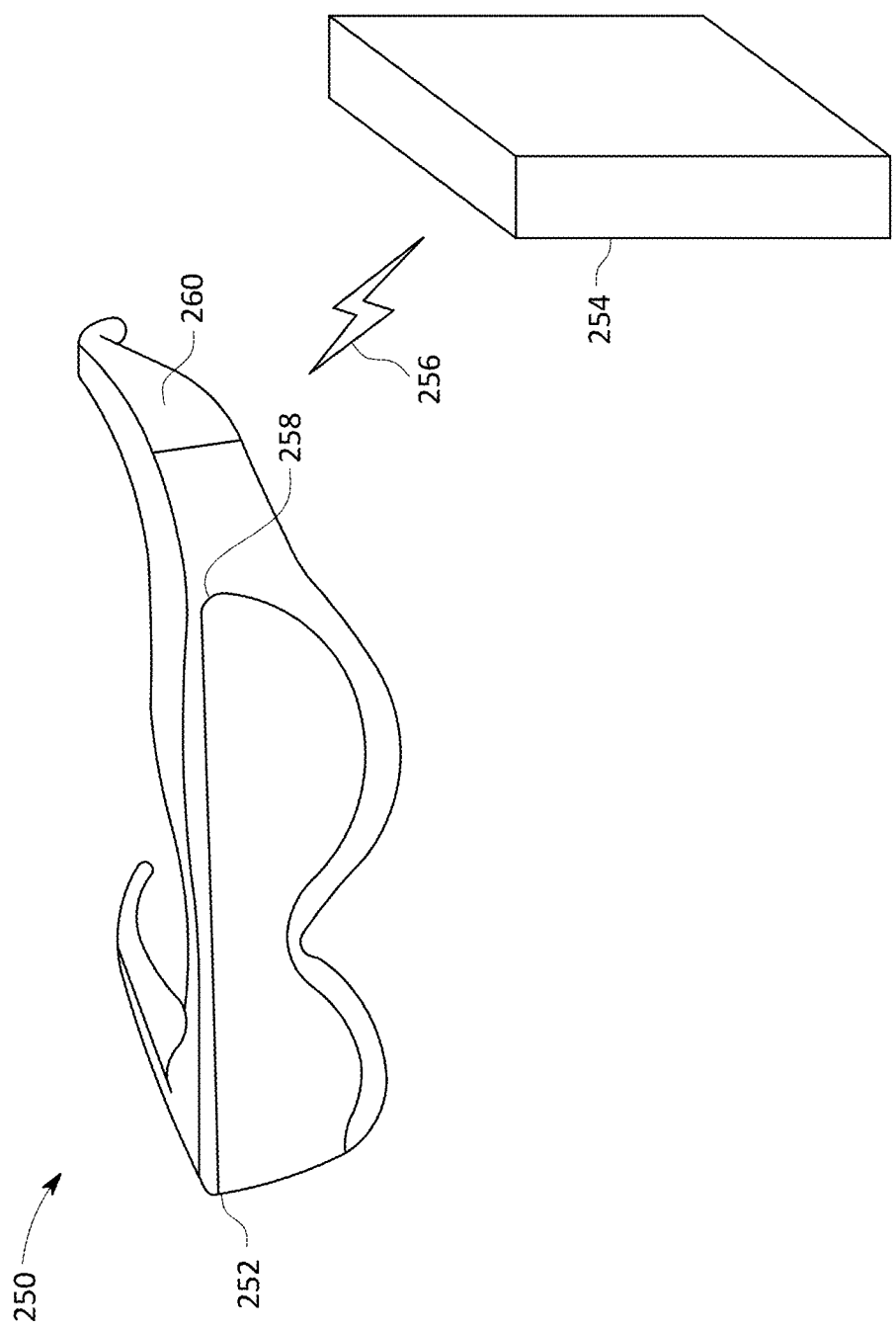
FIG. 2B is a wire diagram illustrating a mixed reality headset which can be used in some implementations of the present technology.

FIG. 2B is a wire diagram of a mixed reality HMD system 250 which includes a mixed reality HMD 252 and a core processing component 254. The mixed reality HMD 252 and the core processing component 254 can communicate via a wireless connection (e.g., a 60 GHZ link) as indicated by link 256. In other implementations, the mixed reality system 250 includes a headset only, without an external compute device or includes other wired or wireless connections between the mixed reality HMD 252 and the core processing component 254. The mixed reality HMD 252 includes a pass-through display 258 and a frame 260. The frame 260 can house various electronic components (not shown) such as light projectors (e.g., LASERs, LEDs, etc.), cameras, eye-tracking sensors, MEMS components, networking components, etc.

The projectors can be coupled to the pass-through display 258, e.g., via optical elements, to display media to a user. The optical elements can include one or more waveguide assemblies, reflectors, lenses, mirrors, collimators, gratings, etc., for directing light from the projectors to a user's eye. Image data can be transmitted from the core processing component 254 via link 256 to HMD 252. Controllers in the HMD 252 can convert the image data into light pulses from the projectors, which can be transmitted via the optical elements as output light to the user's eye. The output light can mix with light that passes through the display 258, allowing the output light to present virtual objects that appear as if they exist in the real world.

Similarly to the HMD 200, the HMD system 250 can also include motion and position tracking units, cameras, light sources, etc., which allow the HMD system 250 to, e.g., track itself in 3DoF or 6DoF, track portions of the user (e.g., hands, feet, head, or other body parts), map virtual objects to appear as stationary as the HMD 252 moves, and have virtual objects react to gestures and other real-world objects.

Figure 2C:
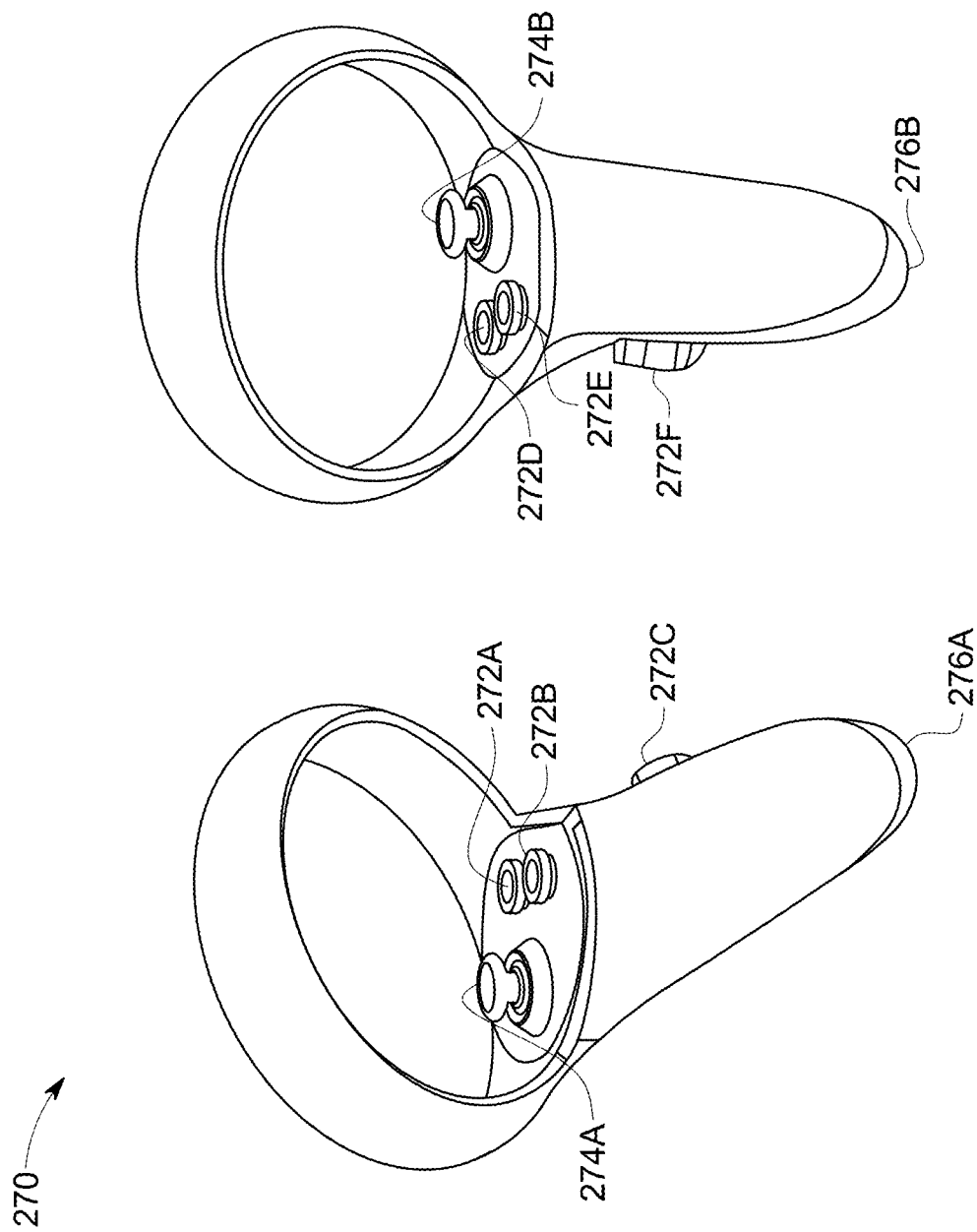
FIG. 2C is a wire diagram illustrating controllers which, in some implementations, a user can hold in one or both hands to interact with an artificial reality environment.

FIG. 2C illustrates controllers 270 (including controller 276A and 276B), which, in some implementations, a user can hold in one or both hands to interact with an artificial reality environment presented by the HMD 200 and/or HMD 250. The controllers 270 can be in communication with the HMDs, either directly or via an external device (e.g., core processing component 254). The controllers can have their own IMU units, position sensors, and/or can emit further light points. The HMD 200 or 250, external sensors, or sensors in the controllers can track these controller light points to determine the controller positions and/or orientations (e.g., to track the controllers in 3DoF or 6DoF). The compute units 230 in the HMD 200 or the core processing component 254 can use this tracking, in combination with IMU and position output, to monitor hand positions and motions of the user. The controllers can also include various buttons (e.g., buttons 272A-F) and/or joysticks (e.g., joysticks 274A-B), which a user can actuate to provide input and interact with objects.

In various implementations, the HMD 200 or 250 can also include additional subsystems, such as an eye tracking unit, an audio system, various network components, etc., to monitor indications of user interactions and intentions. For example, in some implementations, instead of or in addition to controllers, one or more cameras included in the HMD 200 or 250, or from external cameras, can monitor the positions and poses of the user's hands to determine gestures and other hand and body motions. As another example, one or more light sources can illuminate either or both of the user's eyes and the HMD 200 or 250 can use eye-facing cameras to capture a reflection of this light to determine eye position (e.g., based on set of reflections around the user's cornea), modeling the user's eye and determining a gaze direction.

Figure 3:
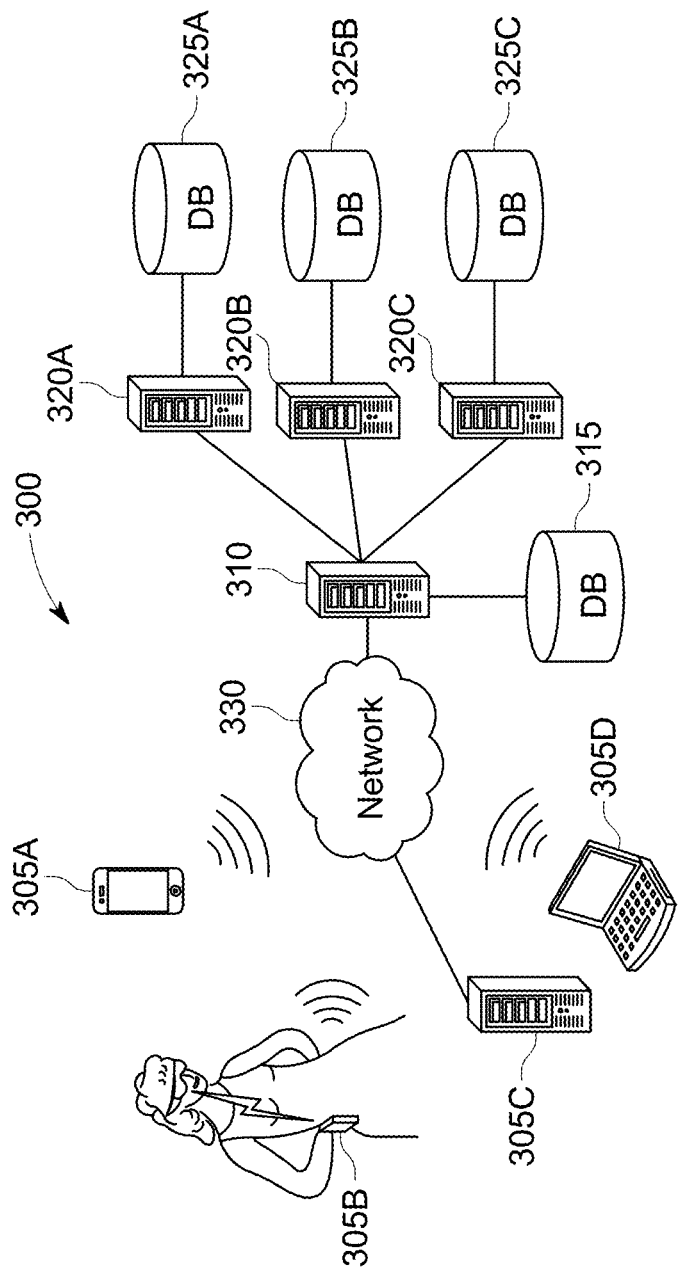
FIG. 3 is a block diagram illustrating an overview of an environment in which some implementations of the present technology can operate.

FIG. 3 is a block diagram illustrating an overview of an environment 300 in which some implementations of the disclosed technology can operate. Environment 300 can include one or more client computing devices 305A-D, examples of which can include computing system 100. In some implementations, some of the client computing devices (e.g., client computing device 305B) can be the HMD 200 or the HMD system 250. Client computing devices 305 can operate in a networked environment using logical connections through network 330 to one or more remote computers, such as a server computing device.

In some implementations, server 310 can be an edge server which receives client requests and coordinates fulfillment of those requests through other servers, such as servers 320A-C. Server computing devices 310 and 320 can comprise computing systems, such as computing system 100. Though each server computing device 310 and 320 is displayed logically as a single server, server computing devices can each be a distributed computing environment encompassing multiple computing devices located at the same or at geographically disparate physical locations.

Client computing devices 305 and server computing devices 310 and 320 can each act as a server or client to other server/client device(s). Server 310 can connect to a database 315. Servers 320A-C can each connect to a corresponding database 325A-C. As discussed above, each server 310 or 320 can correspond to a group of servers, and each of these servers can share a database or can have their own database. Though databases 315 and 325 are displayed logically as single units, databases 315 and 325 can each be a distributed computing environment encompassing multiple computing devices, can be located within their corresponding server, or can be located at the same or at geographically disparate physical locations.

Network 330 can be a local area network (LAN), a wide area network (WAN), a mesh network, a hybrid network, or other wired or wireless networks. Network 330 may be the Internet or some other public or private network. Client computing devices 305 can be connected to network 330 through a network interface, such as by wired or wireless communication. While the connections between server 310 and servers 320 are shown as separate connections, these connections can be any kind of local, wide area, wired, or wireless network, including network 330 or a separate public or private network.

Figure 4:
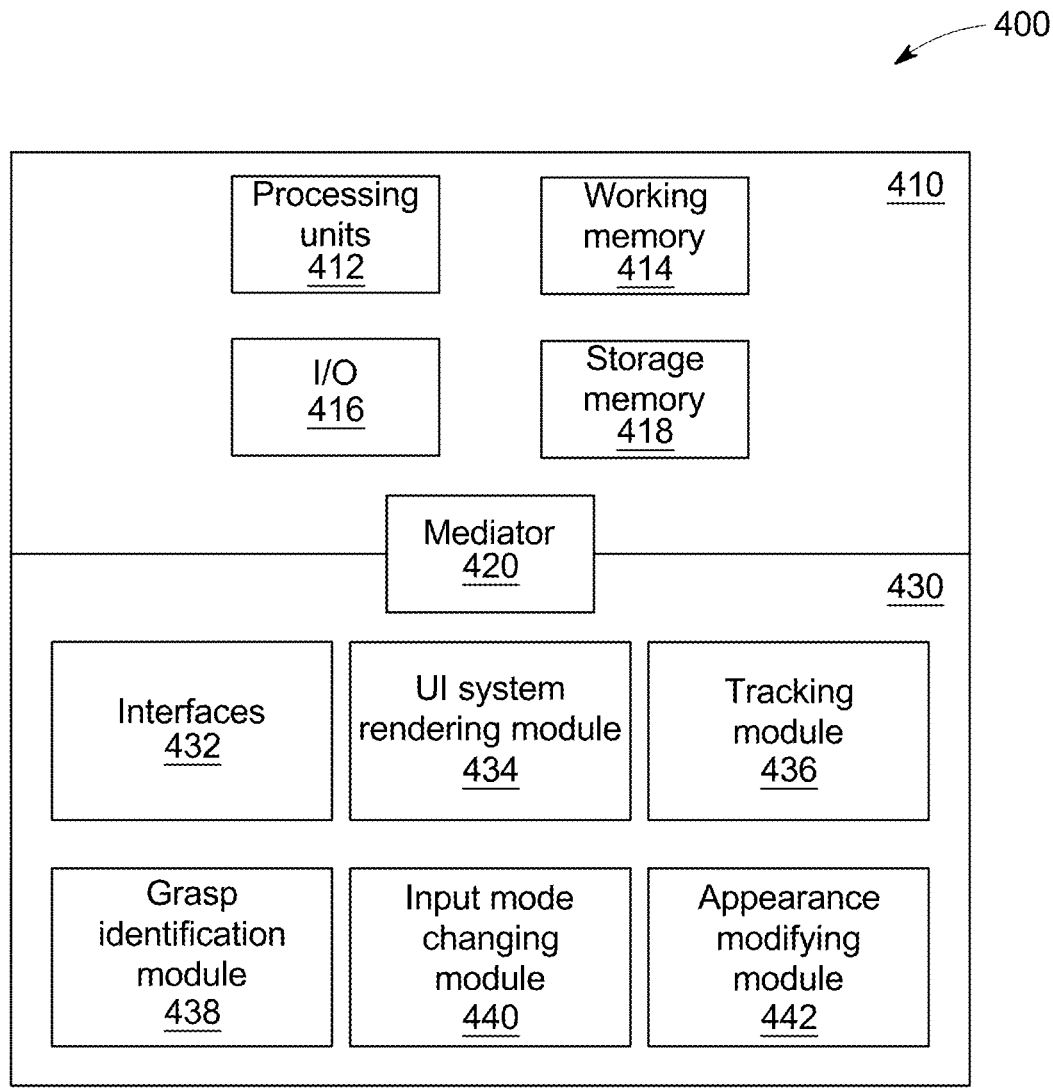
FIG. 4 is a block diagram illustrating components which, in some implementations, can be used in a system employing the disclosed technology.

FIG. 4 is a block diagram illustrating components 400 which, in some implementations, can be used in a system employing the disclosed technology. Components 400 can be included in one device of computing system 100 or can be distributed across multiple of the devices of computing system 100. The components 400 include hardware 410, mediator 420, and specialized components 430. As discussed above, a system implementing the disclosed technology can use various hardware including processing units 412, working memory 414, input and output devices 416 (e.g., cameras, displays, IMU units, network connections, etc.), and storage memory 418. In various implementations, storage memory 418 can be one or more of: local devices, interfaces to remote storage devices, or combinations thereof. For example, storage memory 418 can be one or more hard drives or flash drives accessible through a system bus or can be a cloud storage provider (such as in storage 315 or 325) or other network storage accessible via one or more communications networks. In various implementations, components 400 can be implemented in a client computing device such as client computing devices 305 or on a server computing device, such as server computing device 310 or 320.

Mediator 420 can include components which mediate resources between hardware 410 and specialized components 430. For example, mediator 420 can include an operating system, services, drivers, a basic input output system (BIOS), controller circuits, or other hardware or software systems.

Specialized components 430 can include a UI system rendering module 434, a tracking module 436, a grasp identification module 438, an input changing module 440, an appearance modifying module 442, and components which can be used for providing user interfaces, transferring data, and controlling the specialized components, such as interfaces 432. In some implementations, the components 400 can be in a computing system that is distributed across multiple computing devices or can be an interface to a server-based application executing one or more of the specialized components 430. Although depicted as separate components, the specialized components 430 may be logical or other nonphysical differentiations of functions and/or may be submodules or code-blocks of one or more applications.

The system UI rendering module 434 may be configured to render the system UI in the XR environment. The system UI may be rendered as a 3D virtual object in the XR environment. The system UI may be initially rendered in the XR environment in such a way that the system UI is at an eye level of the user, where the system UI was when it was last visible, attached to a part of the user (e.g., hand or wrist), etc. Further, the system UI may also be rendered at a distance from the user such that the system UI is easily accessible for the user in the XR environment. Details of the rendering of the system UI in the XR environment are further provided, for example, in FIG. 5.

The tracking module 436 may be configured to track a position of the hand of the user and a pre-defined stable point on the user. The tracking of the position of the hand may be performed in order to determine the actual position and/or gestures of the hand of the user in a real world environment. For example, the tracking of the position of the hand is performed to determine the grasping of the system UI by the user. The tracking of the pre-defined stable point on the user is performed to adjust a distance and an angle of the system UI with respect to the user. For example, the tracking of the position may be performed based on input data received using one or more sensors (e.g., cameras, time of flight sensors, IMU units, etc.) on an XR device (for example, the HMD 200 or 250). Further, the tracking module 436 may also receive the input data based on the controllers 270 associated with the XR device. Details of the tracking of the position of the hand of the user, and the pre-defined stable point are further provided, for example, in FIG. 5.

The grasp identification module 438 may be configured to identify the grasping of the system UI by the user in the XR environment. The grasping of the system UI by the user may be identified by tracking the position of the hand of the user in the real world environment. Based on the tracking, the grasp identification module 438 may determine that the hand of the user is near an edge of the system UI to grasp the system UI. Moreover, the grasp identification module 438 may identify a portion of the system UI grasped by the user in the XR environment. The grasped portion may be further utilized as a point for rotating the position of the system UI in the XR environment. The system UI is rotated around the grasped portion to adjust the position of the system UI corresponding to an eye level of the user. Details of the grasping of the system UI by the user in the XR environment are further provided, for example, in FIG. 6A.

The input changing module 440 may be configured to change input mode of interaction from ray casting to direct touch mode and vice versa. The input changing module 440 is configured to change input mode of interaction based on a determined distance between the system UI and the user. When the distance between system UI and the user is below a first threshold, the input changing module 440 changes the mode of interaction to a direct touch mode of interaction. When the distance between system UI and the user is above a second threshold, the input changing module 440 changes the mode of interaction to a ray casting mode of interaction. In the direct touch mode of interaction, the user may interact with the three-dimensional (3D) set of UI elements of the system UI. In the ray casting mode of interaction, the user may interact with the two-dimensional (2D) set of UI elements of the system UI. Details of the changing of the input modes of interaction, are further provided, for example, in FIGS. 7A-7C.

The appearance modifying module 442 may be configured to modify the appearance of the system UI and of one or more of the set of UI elements of the system UI. For example, the appearance modifying module 442 is configured to modify a shape of the system UI to be a flat shape in the direct touch mode of interaction. Further, in the direct touch mode of interaction, the appearance modifying module 442 is configured to modify the appearance of the set of UI elements to have the 3D shape and to be a fixed size defined for each of the one or more of the set of UI elements.

The appearance modifying module 442 is further configured to modify the shape of the system UI to a curved shape in the ray casting mode of interaction. In the ray casting mode of interaction, the user is at a certain distance from the system UI, thus, the curved system UI helps the user to interact more efficiently with the system UI. Furthermore, in the ray casting mode of interaction, the appearance modifying module 442 is configured to modify the appearance the set of UI elements to have the 2D shape and have a relative size defined based on the determined distance of the user from the system UI. For example, when the distance between the user and the system UI is more, the size of the one or more of the set of UI elements may be increased. Details of the modification in the appearance of the system UI and the UI elements, are further provided, for example, in FIGS. 7A-7C, 10, and 11A-D.

Those skilled in the art will appreciate that the components illustrated in FIGS. 1-4 described above, and in each of the flow diagrams discussed below, may be altered in a variety of ways. For example, the order of the logic may be rearranged, substeps may be performed in parallel, illustrated logic may be omitted, other logic may be included, etc. In some implementations, one or more of the components described above can execute one or more of the processes described below.

Figure 5:
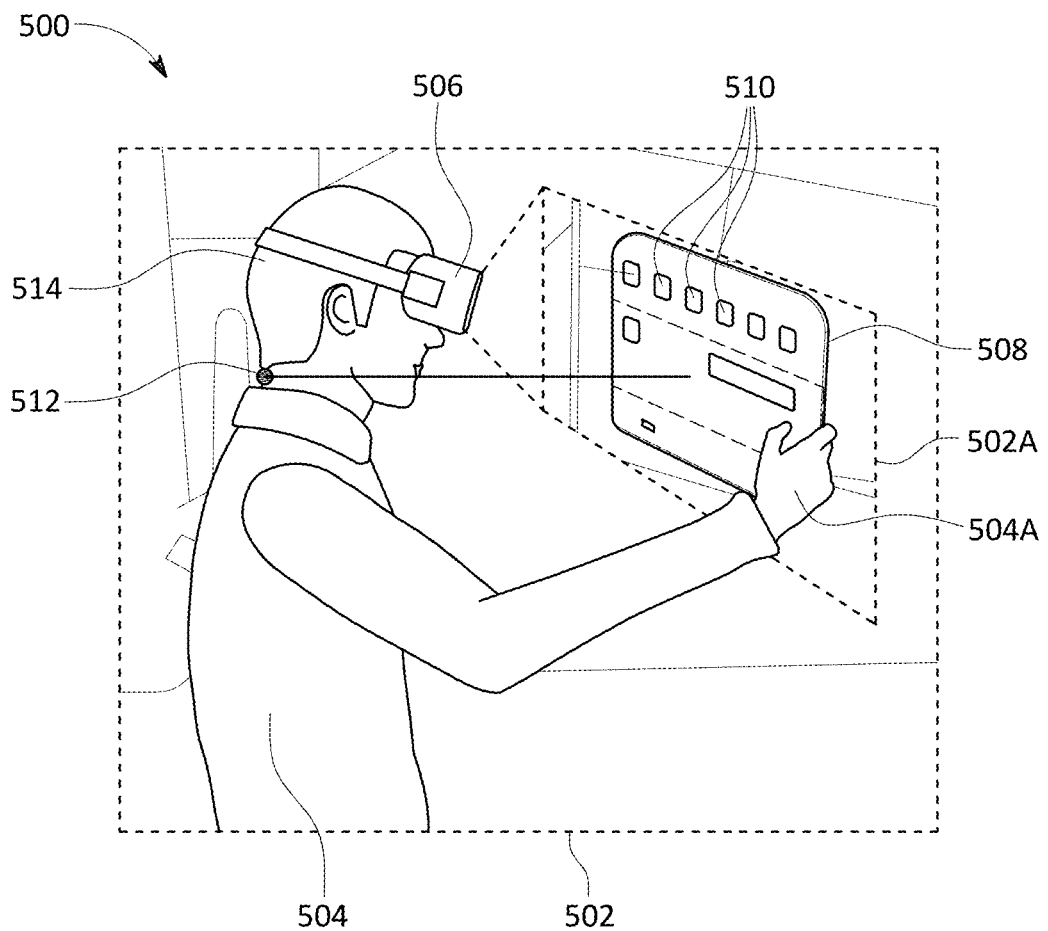
FIG. 5 is a conceptual diagram illustrating an exemplary environment for user interface (UI) interactions in an artificial reality (XR) environment.

FIG. 5 is a conceptual diagram illustrating an exemplary environment 500 for system UI interactions in the XR environment. The environment 500 may include a real world environment 502. The real world environment 502 may include a user 504 wearing an XR device 506. The environment 500 may include an XR environment 502A (shown by the XR device 506) that comprises a system UI 508 rendered in the XR environment 502A. The real world environment 502 and the XR environment 502A may occupy a same physical space, i.e., user movements in the real world environment 502 can cause corresponding changes, such as to the user's viewpoint, in the XR environment 502A. In some cases, the XR environment 502A may be a mixed reality or augmented reality environment, where the user can see an overlay representation of the system UI 508 rendered in conjunctions with the real world environment 502.

In one implementation, the system UI 508 may be rendered in the XR environment 502A. The system UI 508 may be 3D virtual element that is rendered in front of the user 504 in the XR environment 502A. The system UI 508 includes a set of UI elements 510 arranged on a surface of the system UI 508. The set of the UI elements 510 may be visual elements that can be seen on the system UI 508. For example, the set of UI elements 510 may be icons, buttons, menus, text fields, images, videos, 3D meshes, progress bars, and so forth. The set of UI elements 510 enables utilization of the system UI 508 by the users for various purposes for example, browsing a website or accessing an application. The set of UI elements 510 may be of any shape and size.

The system UI 508 may be used to interact with virtual objects, environments, or information on the physical and/or virtual world. More particularly, the system UI 508 may be any UI through which the interaction between users and the XR environment 502A may occur. The system UI 508 may receive one or more inputs from the user 504 via the XR device 506 and provide an output based on the received input from the user 504. The system UI 508 may be one of, for example, composite user interface (CUI), and/or multimedia user interface (MUI) and/or the like.

The XR device 506 may be a wearable device that may be used by the user 504 (for example, a person wearing the XR device 502) to interact with the system UI 508 in the XR environment 502A. The XR device 506 may be one of physical device, such as including a head-mounted display (HMD) connected to a host computer system, a standalone HMD, a mobile device or computing system, or any other hardware platform capable of providing artificial reality content. For example, the XR device 506 may be the virtual reality head-mounted display (HMD) 200, as explained, for example, in FIG. 2A and/or the mixed reality HMD system 250 as explained, for example, in FIG. 2B. The XR device 506 may have one or more sensors that can track the position of a hand 504A of the user 504 and/or that can also detect gestures of the hand 504A of the user 504 in real time. In an example, the hand 504A of the user 504 may be depicted as a representation of the hand 504A of the user 504 in the XR environment 502A. A position of such a representation of the hand 504A of the user 504 may be updated in the XR environment 502A based on the tracking of the position of the hand 504A of the user 504 in the real world environment 502. Further, the tracking of the position of the hand 504A of the user 504 may also be performed using controllers 270 (e.g., hand controller), for example, explained in FIG. 2C associated with the XR device 506 or a controller that can be a wearable device, which may include self-tracking capabilities similar to those of HMD 200 or 250 or may have a design, emit lighting, or other signals that enable tracking of the controller by HMD 200 or 250.

The computing system may have one or more sensors that can track the position of a pre-defined stable point 512 on the user 504. For example, the one or more sensors may be a part of the XR device 506. The stable point 512 may be a most stable point of a user's head 514. The stable point 512 on the user 504 may be utilized as a fixed point to adjust a position of the system UI 508 in the XR environment 502A. In an implementation, the pre-defined stable point 512 on the user 504 may be a point where the base of the user's head 514 meets the user's neck. The point where the base of the user's head 514 meets the user's neck may be selected as the stable point 512 as when the user's head 514 moves, a top end of the neck may remain stationary. Thus, the stable point 512 may be taken as a reference point to arrange the position of the system UI 508 in the XR environment 502A.

In some implementations, the pre-defined stable point 512 on the user 504 may be a point offset from where the base of the user's head meets the user's neck. For example, the offset can be a certain space (such as three inches) from the base of the user's neck toward the user's eyes. The offset can further be based on a threshold height from an eye level of the user 504. For example, the pre-defined stable point 512 may be at an offset of 10 centimeter (cm) towards eyes of the user 512.

In some implementations, the pre-defined stable point 512 may be a point offset from a defined body point on the user 512. For example, the defined body point may also be a point different from the point where the base of the user's head 514 meets the user's neck. For example, the defined body point may be on shoulder, head, neck, at the eyes, the center of the forehead, or on any other body part of the user 504. The direction and amount of the offset may be based on a determination of a relative position of the system UI 508 with respect to an eye level of the user 504. The direction of the offset may be such that the surface of the system UI remains towards the eye level of the user 504. For example, if the relative position of the system UI 508 is lower than the eye level of the user 504, the amount of offset may be more. In an exemplary scenario, the position of the system UI 508 is less than a threshold height (e.g., 15 cm) from the eye level of the user 504, the amount of offset may be 5 cm below the pre-defined stable point 508 for the user 504. In this manner, the pre-defined stable point 512 may be customized for different users, such that the stable point 512 is unique to each user, for a comfortable and user friendly interaction with the system UI 508.

Figure 6A:
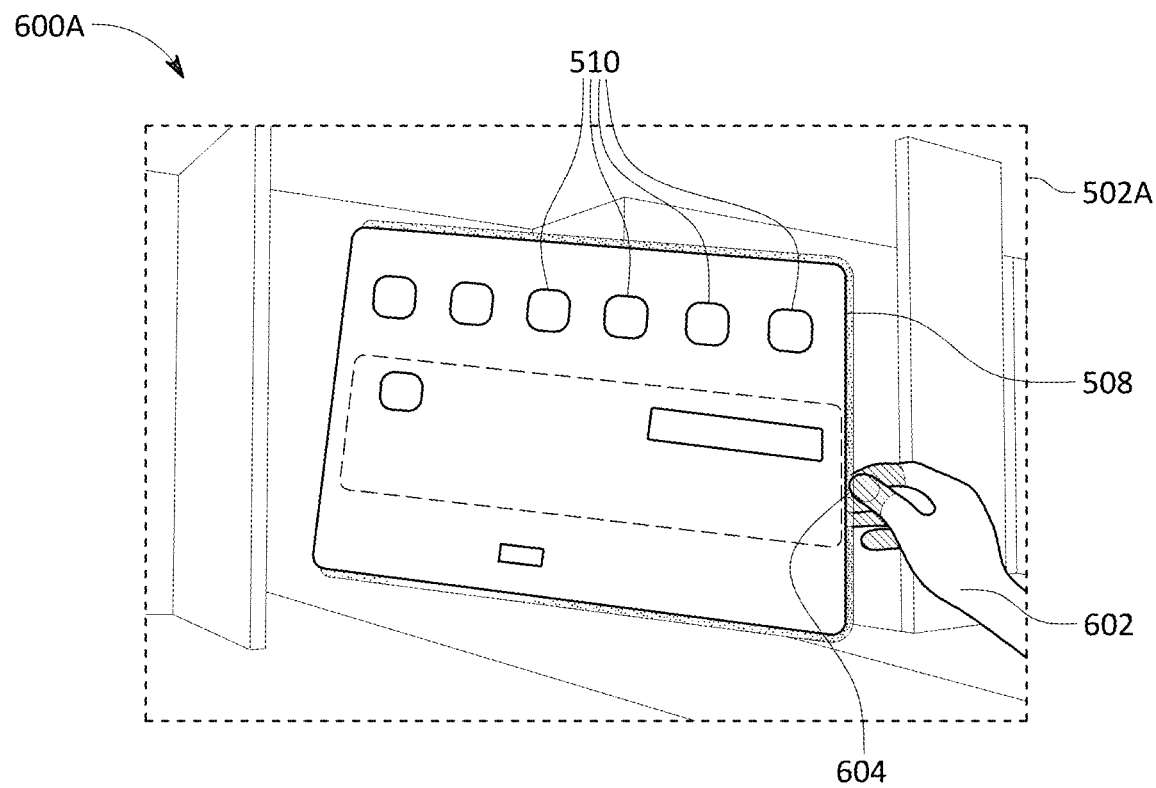
FIG. 6A and FIG. 6B are conceptual diagrams illustrating rotation of a system UI in the XR environment.
Figure 6B:
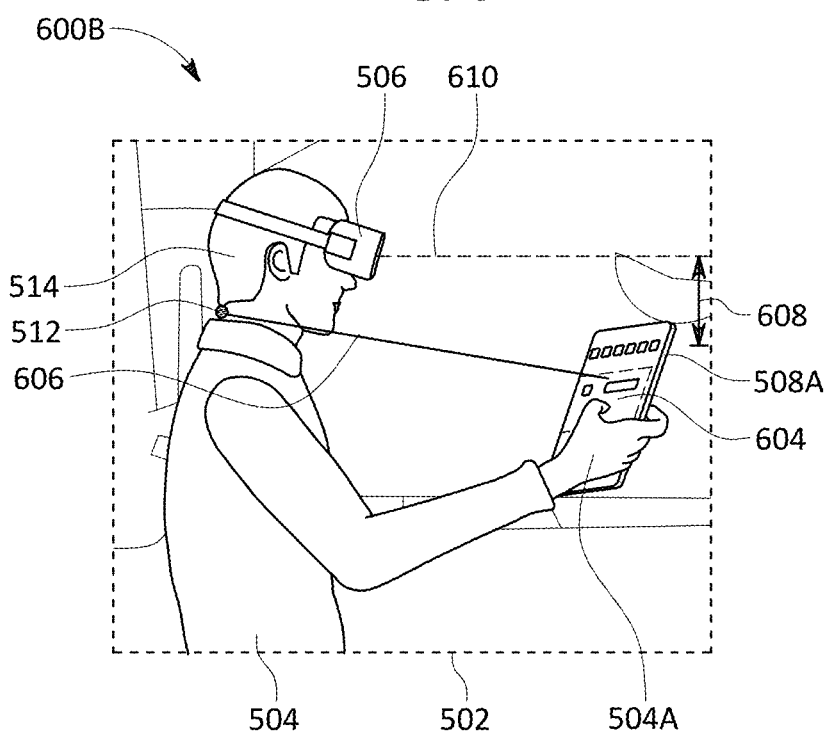

FIG. 6A and FIG. 6B are conceptual diagrams illustrating rotation of the system UI 508 in the XR environment 502A. FIG. 6A depicts a diagram 600A for illustrating grasping of the system UI 508 by the user 504. The diagram 600A includes the XR environment 502A. The XR environment 502A includes the system UI 508 and a representation 602 of the hand 504A of the user 504.

The computing system may be configured to track the position of the hand 504A of the user 504 and the stable point 512. The tracking may be performed, for example, by use of the one or more sensors of the XR device 506 or the controllers 270 associated with the XR device 506. For example, a distance between an edge of the system UI 508 and the position of the hand 504A of the user 504 may be tracked. Moreover, a gesture of grasping the edge of the system UI 508 may be tracked. The distance and the gesture may be tracked to determine an intention of the user 504 to grasp the system UI 508.

In an exemplary scenario, the user 504 moves the hand 504A (depicted as the representation 602 in the XR environment 502A) close to the edge of the system UI 508. The user 504 further performs the gesture of grasping the edge of the system UI 508 by bringing a thumb and one or more fingers of the hand 504A together. The computing system tracks the gesture of grasping the system UI 508.

Based on the tracking of the position of the hand 504A of the user 504 (such as the gesture and the distance of the hand), the computing system identifies, that the hand 504A (depicted as the representation 602 in the XR environment 502A) has grasped a portion 604 of the system UI 508. After identifying that the hand 504A has grasped the portion 604 of the system UI 508, the computing system rotates the position of the system UI 508 around the grasped portion 604 of the system UI 508. Such a rotation enables restriction of undesirable movement of the system UI 508 in the XR environment 502A. For example, the rotation around the grasped portion 604 restricts flexible bending movement of the system UI 508.

Furthermore, the computing system rotates the position of the system UI 508, such that a line (e.g., line 606 of FIG. 6), between the pre-defined stable point 512 and the surface of the system UI 508, is moved, to be perpendicular or at a predefined angle from perpendicular to the surface of the system UI 508, as the user 504 moves the system UI 508 via the grasped portion 604. The rotation of the system UI 508 with respect to the line and the stable point 512 is shown in FIG. 6B.

FIG. 6B depicts a diagram 600B for illustrating rotation of the system UI 508 based on the stable point 512 and the grasped portion 604 of the system UI 508. The diagram 600B may include the real world environment 502 that may include the user 504 wearing the XR device 506. The real world environment 502 depicts an overlay representation 508A of the system UI 508. The overlay representation 508A illustrates how the position of the system UI 508 exists relative to the real-world environment 502. In some cases, the XR environment 502A may be a mixed reality or augmented reality environment, where the user 504 can see the overlay representation 508A of the system UI 508 rendered in conjunctions with the real world environment 502. For example, the user 504 may be able to view the overlay representation 508A of the system UI 508 rendered in the XR environment 502A via the XR device 506 while the user 504 can see the real world environment 502. In other cases, the XR environment 502A can be a virtual environment where what the user 504 sees is completely computer generated. Thus, in these cases, the overlay representation 508A of the system UI 508 can be not visible in conjunction with the real world environment 502, but instead is rendered into the virtual space in which the user 504 is moving while also moving in the real world environment 502.

A conceptual line 606 is shown between the stable point 512 and the surface of the system UI 508. For example, the line 606 is a virtual line that is invisible to the user 504. The line 606 is used to depict the rotation of the system UI 508 with respect to the stable point 512 of the user 504. As the user 504 moves the system UI 508 via the grasped portion 604 of the system UI 508, the computing system rotates the position of the system UI 508. The rotation is such that the line 606 is moved, to be perpendicular or at a predefined angle (discussed below) from perpendicular to the surface of the system UI 508.

In an exemplary scenario, the user 504 may move the head 514 in the real world environment 502 to view and use the system UI 508. However, the stable point 512 of the user 504 may remain at a same position as the neck of the user 504 may be unmoved as the head 514 is moved. Thus, the position of the system UI 508 may remain same in the XR environment 502A, even when the head 514 of the user 504 is moved, thereby providing a hassle-free and comfortable viewing experience to the user 504. Moreover, when the user 504 moves the system UI 508 in the XR environment 502A, the system UI 508 is moved such the line 606 between the stable point 512 and the surface of the system UI 508 is perpendicular or at a predefined angle from perpendicular to the surface of the system UI 508. Thus, when the system UI 508 is moved towards or away from the user 504, up and down in the XR environment 502A, or tilted in any direction in the in the XR environment 502A, the surface of the system UI 508 is towards the head of the user 504.

In some implementations, the predefined angle from the perpendicular can be a rotation amount toward the user's eyes, e.g., up to five degrees rotation off perpendicular to angle the system UI surface more toward the user's eyes. In some implementations, the predefined angle can be based on a height of the system UI 508. Thus, the computing system can rotate the position of the system UI 508 such that the line 606 is moved to be at a predefined angle from the perpendicular to the surface of the system UI 508, where the predefined angle can be selected based on the determination that the position of the system UI 508 is less than an offset 608 from the threshold height of the user's eyes. The threshold height offset 608, in FIG. 6B, is relative to an eye level 610 of the user 504, but can be set at other characteristics such as the height of the user's shoulder, sternum midpoint, hip height, specified distance above the ground, a relative offset from one of these determined heights, etc. For example, the threshold height offset 608 may be measured from the eye level 610 of the user 504 towards a ground level. The predefined angle can be relative to this height, e.g., a linear or exponential relationship can be defined that provides how much the surface of the system UI 508 should be turned toward the user's eyes given the offset of the system UI 508 from the height 610. In some cases, the function that defines the linear or exponential can be capped to provide a predefined angle that is no greater than a maximum such as ten degrees.

Figure 7A:
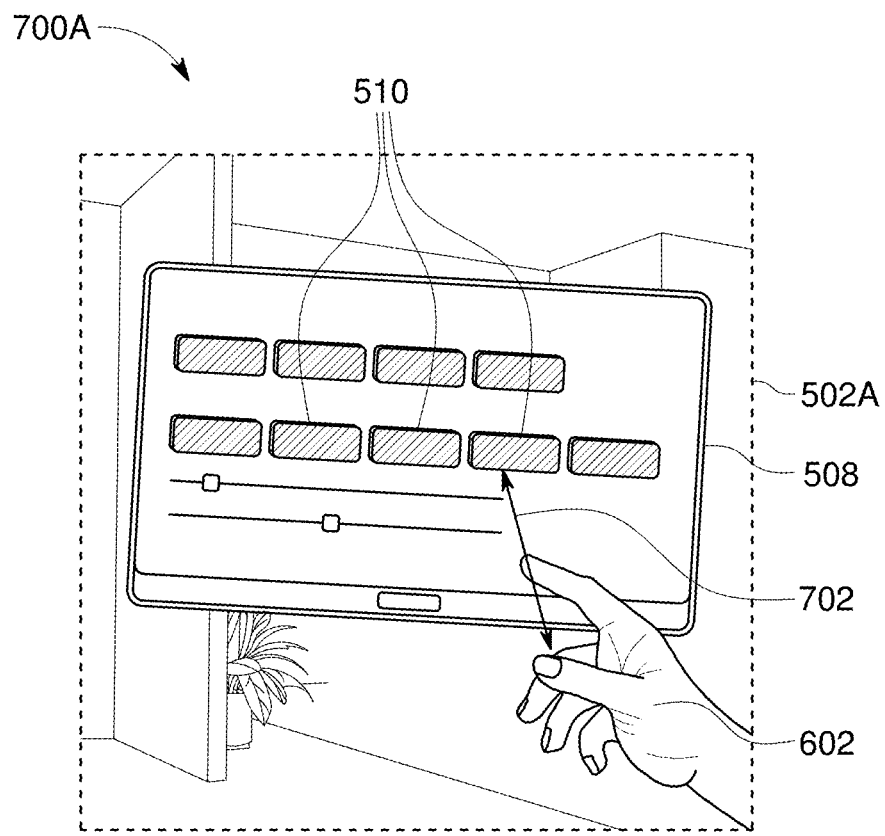
FIG. 7A, FIG. 7B and FIG. 7C are conceptual diagrams illustrating changing of input modes of the system UI.
Figure 7B:
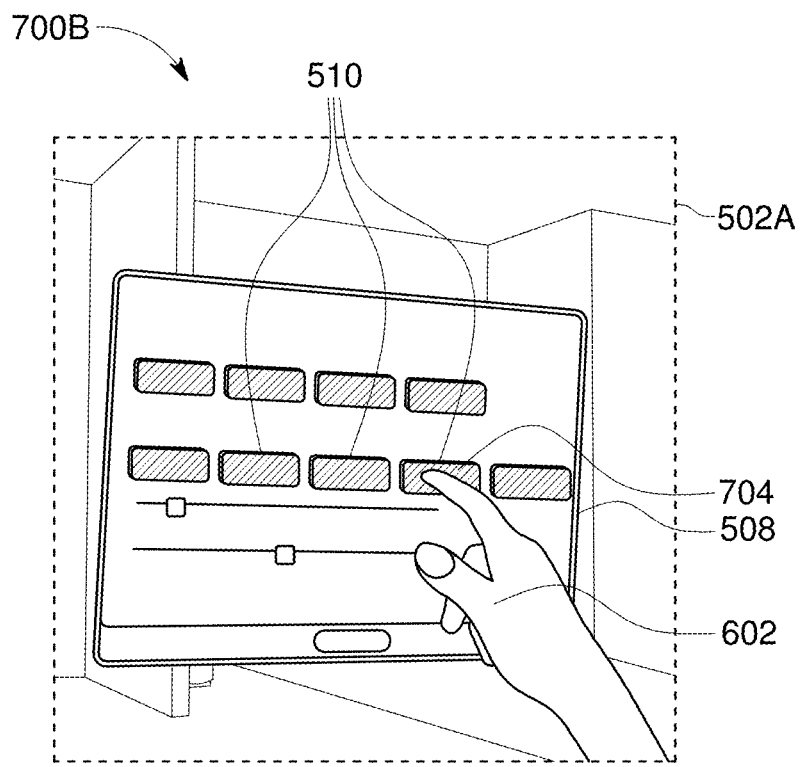
Figure 7C:
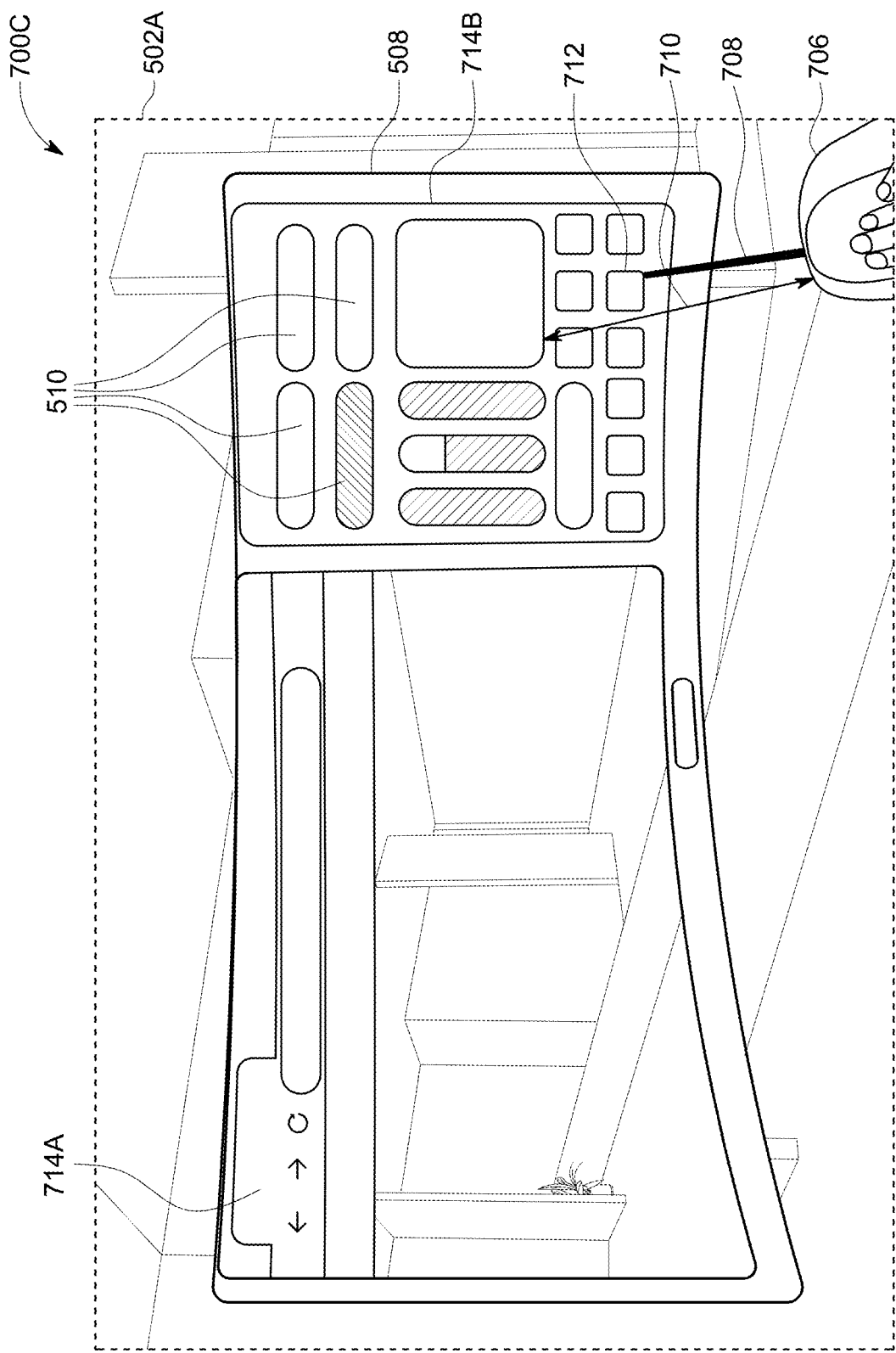

FIG. 7A, FIG. 7B and FIG. 7C are conceptual diagrams illustrating changing of the input modes of the system UI 508 based on the distance between the user 504 and the system UI 508. FIG. 7A includes a diagram 700A that depicts a direct touch mode of interaction. The diagram 700A includes the XR environment 502A. The XR environment 502A includes the system UI 508 and the representation 602 of the hand 504A of the user 504.

The computing system may be configured to track the position of the user 512. Based on the tracking, the computing system determines the distance between the user 504 and the system UI 508. In an implementation, the distance between the user 504 and the system UI 508 is determined based on at least the distance between the hand 504A of the user 504 and the surface of the system UI 508. The distance between the hand 504A of the user 504 and the surface of the system UI 508 is depicted as the distance between the representation 602 of the hand 504A of the user 504 in the XR environment 502A. For example, the distance is determined by calculating the distance between a portion closest to the system UI 508 and the surface of the system UI 508. In an example, the distance is determined between a tip of an index finger of the hand 504A of the user 504 and the surface of the system UI 508.

Furthermore, in response to determining that the distance is below a first threshold 702, the computing system may change an input mode from a ray casting mode of interaction to a direct touch mode of interaction. The first threshold 702 may be a distance from the surface of the system UI 508 towards the user 504. Thus, when the hand 504A of the user 504 reaches the first threshold 702, the input mode changes to the direct touch mode of interaction such that the user 504 may directly interact with the system UI 508. Such direct touch mode of interaction provides the user 504 an experience of directly providing inputs to the system UI 508 via the hand 504A, similar to providing inputs on a device with hand 504A in the real world environment 502. Details of interaction with the system UI 508 using the direct touch mode of interaction are provided in FIG. 7B.

FIG. 7B includes a diagram 700B that depicts the interaction with the system UI 508 using the direct touch mode of interaction. The diagram 700B includes the XR environment 502A. The XR environment 502A includes the system UI 508 and the representation 602 of the hand 504A of the user 504. The system UI 508 further includes the set of UI elements 510. The set of UI elements 510 includes a UI element 704.

In the direct touch mode of interaction, the representation 602 of the hand 504A of the user 504 tracks the real-world location of the hand 504A of the user 504, and interacts with UI elements, such as the UI element 704 of the set of UI elements 510. For example, when the hand 504A of the user 504 moves and touches the UI element 704, the computing system tracks the hand 504A, and the representation 602 of the hand 504A of the user 504 is shown touched to the UI element 704. In an example, the contact of the hand 504A of the user 504 and the UI element 704 may enable selection of the UI element 704 of the set of UI elements 510.

Further, the computing system may modify an appearance of the system UI 508 to have a flat shape, in the direct touch mode of interaction. For example, the edge of the system UI 508 may be flat such that a display of the system UI 508 appears to be flat. Thus, in the direct touch mode of interaction, the computing system provides the user 504 an experience of interacting with the system UI 508 as a touch-screen device, similar to an electronic tablet in the real world environment 502.

In an implementation, the system UI 508 having the flat shape comprises a single screen display. As the system UI 508 is close to the user 504 (and may be held by another hand of the user) in the direct touch mode of interaction, viewing the single screen display may provide a comfortable viewing experience to the user 504.

Furthermore, the computing system may modify an appearance of the one or more of the set of UI elements 510 to have a three-dimensional (3D) shape and to be a fixed size defined for each of the one or more of the set of UI elements 510. The 3D shape may enable the set of UI elements 510 to be at a height from the surface of the system UI 508. The set of UI elements 510 may be shown in the 3D shape such that the user 504 may easily identify which UI element to target. Moreover, the size of the set of UI elements 510 may be fixed, and in some embodiments, the size of the selected UI element may be increased. For example, the size of the UI element 704 may increase when selected.

The computing system may be further configured to switch the input mode from the direct touch mode of interaction to the ray casting mode of interaction, based on the distance between the user 504 and the system UI 508. Details of the ray casting mode of interaction are provided, in FIG. 7C.

FIG. 7C includes a diagram 700C that depicts the interaction with the system UI 508 using the ray casting mode of interaction. The diagram 700C includes the XR environment 502A. The XR environment 502A includes the system UI 508. The XR environment 502A further includes a representation 706 of a controller. The representation 706 of the controller may include a virtual line 708. The system UI 508 further includes the set of UI elements 510.

The computing system may determine that the user 504 has moved such that the distance between the hand 504A (or controller) of the user 504 and the surface of the system UI 508 is above a second threshold 710. In such a case, the computing system may change the input mode from the direct touch mode of interaction to the ray casting mode of interaction.

In an implementation, the first threshold 702 may be closer to the surface of the system UI 508 than the second threshold 710. For example, the first threshold 702 may be 15 cm, and the second threshold 710 may be 25 cm. Thus, when the user 504 has moved such that the hand 504A of the user 504 is more than the second threshold 710 in the XR environment 502A, the computing system may change the input mode to the ray casting mode of interaction.

In the ray casting mode of interaction, the virtual line 708 having a position based on the real-world location of the hand 504A of the user 504, interacts with elements of the set of UI elements 510. The virtual line 708 may be a ray emerging from the representation 706 of the user's hand or controller. The virtual line 708 may be used as a reference by the user 504 to interact with the set of UI elements 510. For example, the virtual line 708 may be used to interact with the UI element 712 of the set of UI elements 510.

In an exemplary scenario, as the distance between the user 504 and the surface of the system UI 508 is above the second threshold 710, the user 504 is far from the system UI 508. Thus, the user 504 may be unable to experience the direct touch mode of interaction. In such a case, the computing system provides the ray casting mode of interaction to the user 504.

Further, the computing system may modify the appearance of the system UI 508 to have a curved shape, in the ray casting mode of interaction. For example, the edge of the system UI 508 may be curved such that the display of the system UI 508 appears to be curved as well. Thus, in the ray casting mode of interaction, the computing system provides the user 504 an experience of interacting with the system UI 508 from a faraway distance.

In an implementation, the system UI 508 having the curved shape comprises a multi-screen display, for example a display 714A and a display 714B. In an exemplary scenario, the user 504 may use multiple applications simultaneously. For example, the display 714A may be a web browser window. In another example, the display 714A may display user interface of applications such as gaming applications, payment applications, shopping applications, and so forth. The display 714B may display the user interface to access controls of the system UI 508. For example, the user 504 utilize the display 714B to set controls such as brightness, volume, and other controls settings for the system UI 508. In an implementation, the multi-screen display may support 3 displays at once. In another implementation, the multi-screen display may support more than 3 displays at once. Thus, by the use of the multi-screen display on the system UI 508, the user 504 may be able to utilize various applications at once without having to switch repeatedly between windows. Moreover, the size of the system UI 508 having the curved shape may be more than the size of the system UI 508 having the flat shape. As the system UI 508 is far away from the user 504 in the ray casting mode of interaction, viewing the curved shape with a large size multi-screen display may provide a comfortable viewing experience to the user 504.

Furthermore, the computing system may modify the appearance of the one or more of the set of UI elements 510 to have a two-dimensional (2D) (yet curved along the curved system UI surface) shape and to be a relative size defined based on the determined distance of the user 504 to the system UI 508. For example, the UI elements closer to the user 504 on the system UI 508 may appear smaller as compared to the UI elements far from the user 504 on the system UI 508 having the curved shape. This relationship can be based on a defined relationship (e.g., linear and can have a defined maximum) that takes the distance and provides a magnification value. In an exemplary scenario, the UI elements near the curved edges of the system UI 508 may appear smaller as compared to the UI elements in a middle of the surface of the system UI 508.

In some implementations, in a case when the distance between the user 512 and the system UI 504 is between the first threshold 702 and the second threshold 710 (e.g., between 15 cm and 25 cm), the computing system keeps its previous input mode. In such a manner of implementing hysteresis, sudden, repeated switching between input modes and system UI display modes, as the user hovers close to a threshold, may be avoided. Moreover, the system UI 508 does not abruptly switch between the ray casting mode to direct touch mode of interaction between the first threshold 702 and the second threshold 710, to avoid flickering or sudden transition between the input modes.

Figure 8:
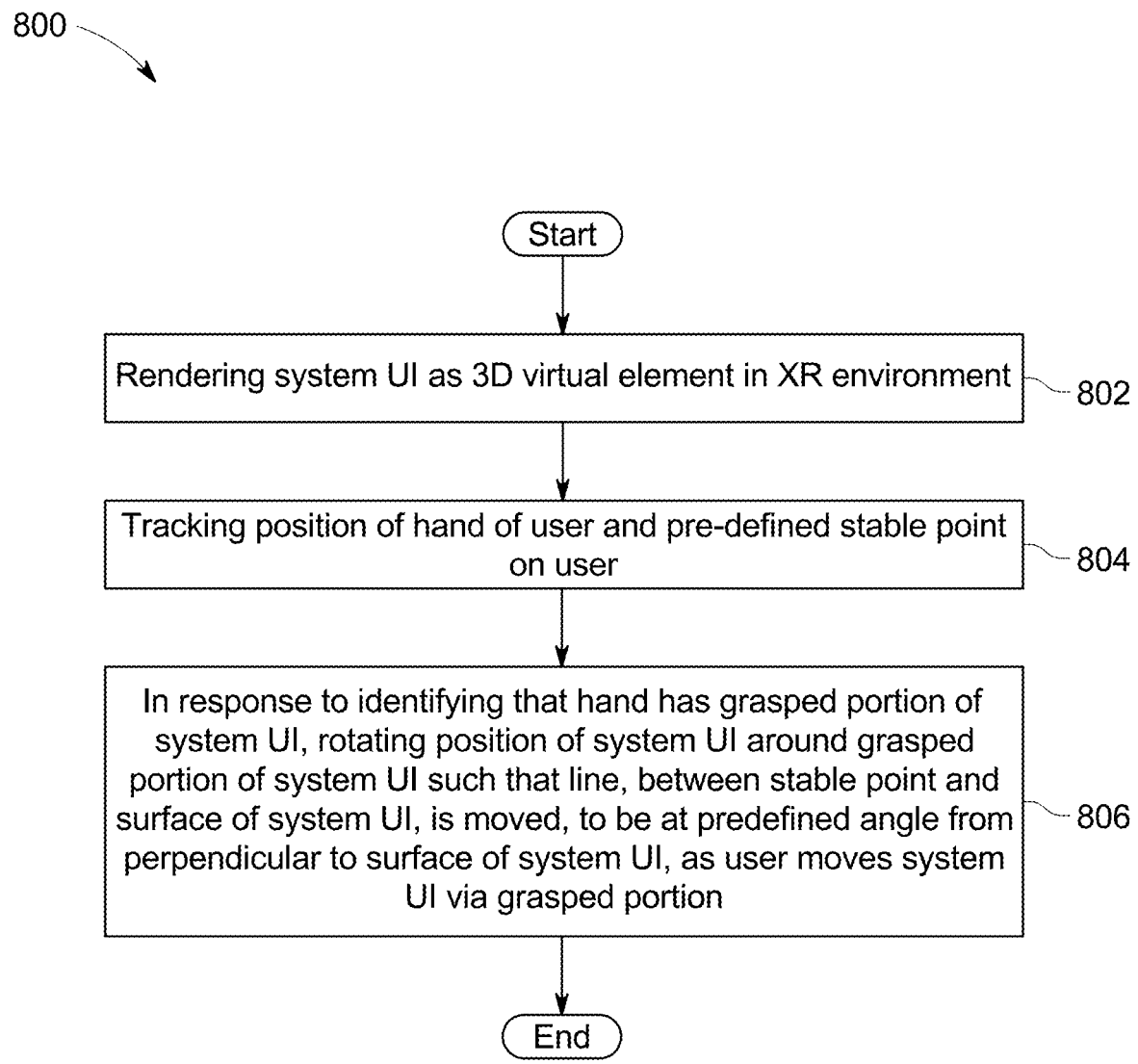
FIG. 8 is a flow diagram of a method 800 in some implementations for rotation of the system UI.

FIG. 8 is a flow diagram of a method 800 used in some implementations for rotation of the system UI 508. In an implementation, the method 800 may be triggered when the computing system and the XR device 506 are connected via the network 330. Once the XR device 506 is activated by the user 504, the computing system may display the XR environment 502A on the XR device 506. Moreover, the computing system may receive an input from the user 504 to render the system UI 508 in the XR environment 502A.

At block 802, the system UI 508 is rendered as the 3D virtual element in the XR environment 502A. For instance, the system UI 508 may be rendered at the position in the XR environment 502A that is in front of the eye level of the user 512 at a preset default position, at a position defined by the user 504, etc. The position of the rendered system UI 508 can be set such that it is within arms reach of the user 504.

At block 804, the position of the hand 504A of the user 504, and a pre-defined stable point 512 on user 504, is tracked by the computing system. The tracking of the position of the hand 504A of the user 504, and the pre-defined stable point 512, may be performed based on positional data that is acquired using the one or more sensors (e.g., cameras, motion sensors, infrared sensors, etc.) present on or in communication with the XR device 506. For example, the one or more sensors may include imaging devices, such as cameras. Moreover, the tracking may be performed by use of the controllers 270. In some implementations, the tracking may be based on or more kinematic models that defines possible movements of a user's body, allowing a machine learning model that receive input based on images of the user to use the kinematic model as constraints for possible positions of various parts of the user's body. In some cases, the machine learning model can use past known positions of parts of the user's body as input to perform time-based predictions of the user's movements. In some cases, image-based user tracking can be supplemented by or replaced with other forms of tracking, such as tracking based on wearables that sense motions of parts of the user's body. As additional sensor data is accumulated, the position of the representation 602 of the hand 504A (or the controller) and the position of the stable point on the user is updated based on the tracking.

At block 806, in response to identifying that the hand 504A of the user 504 has grasped the portion 604 of the system UI 508, the computing system may rotate the position of the system UI 508 around the grasped portion 604 of the system UI 508. The rotation of the position of the system UI 508 is performed such that the line 606 between the pre-defined stable point 512 and the surface of system UI 508, is moved, to be at the perpendicular or at a predefined angle from the perpendicular to the surface of the system UI 508, as the user 504 moves the system UI 508 via the grasped portion 604. In some implementations, this rotation may occur only after the user has moved the system UI by a threshold amount and/or may perform the rotation at a given speed, allowing the system UI not to snap to the rotated position so quickly as to be jarring to the user.

The method 800 may be implemented using corresponding processor of the computing system. In some implementations, a computer programmable product may be provided. The computer programmable product may comprise at least one non-transitory computer-readable storage medium having stored thereon computer-executable program code instructions that when executed by a computer, cause the computer to execute the method 800.

Figure 9A:
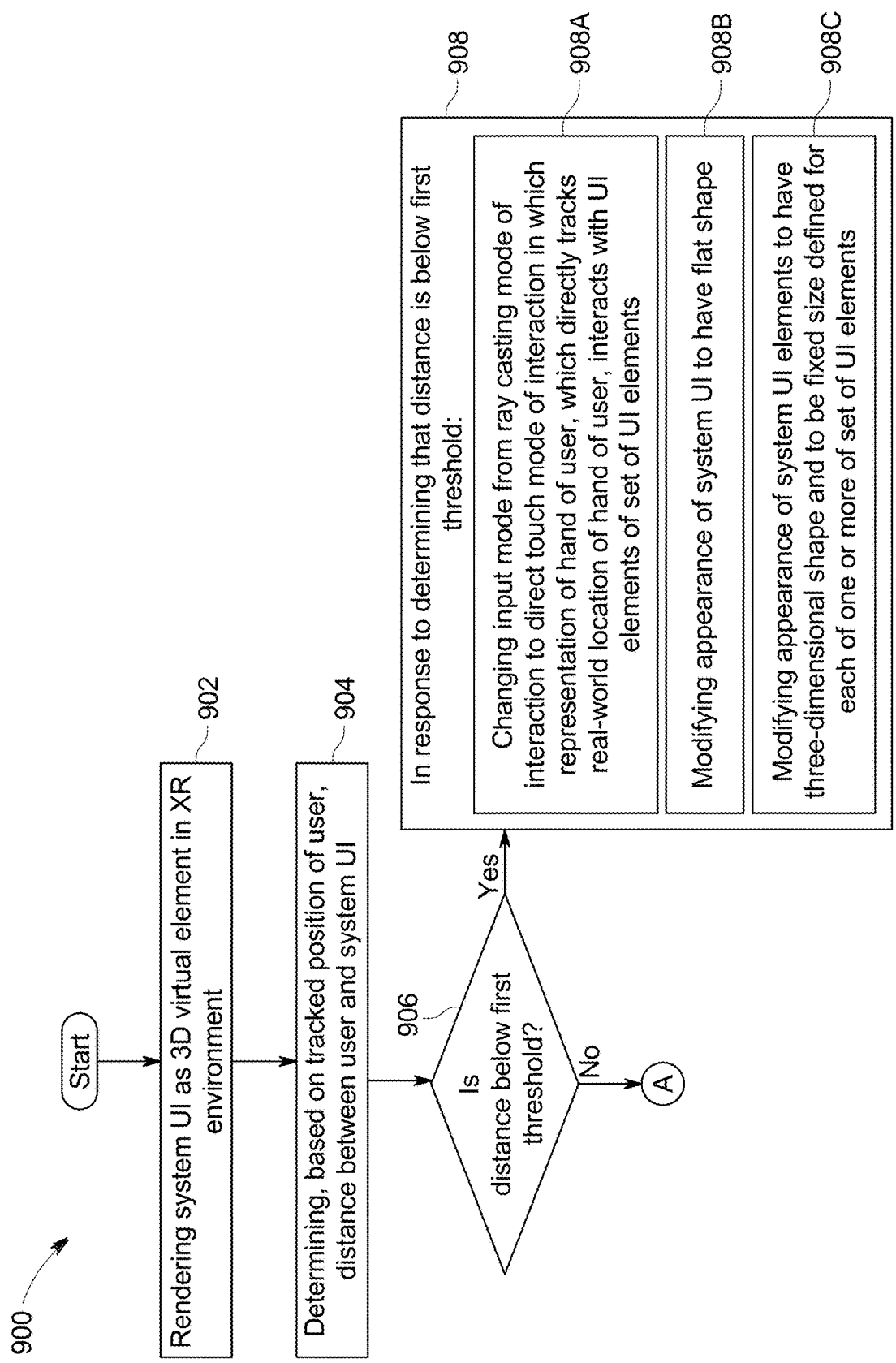
FIG. 9A is a flow diagram of a method used in some implementations for facilitating system user interface (UI) interactions in artificial reality (XR) environment.
Figure 9B:
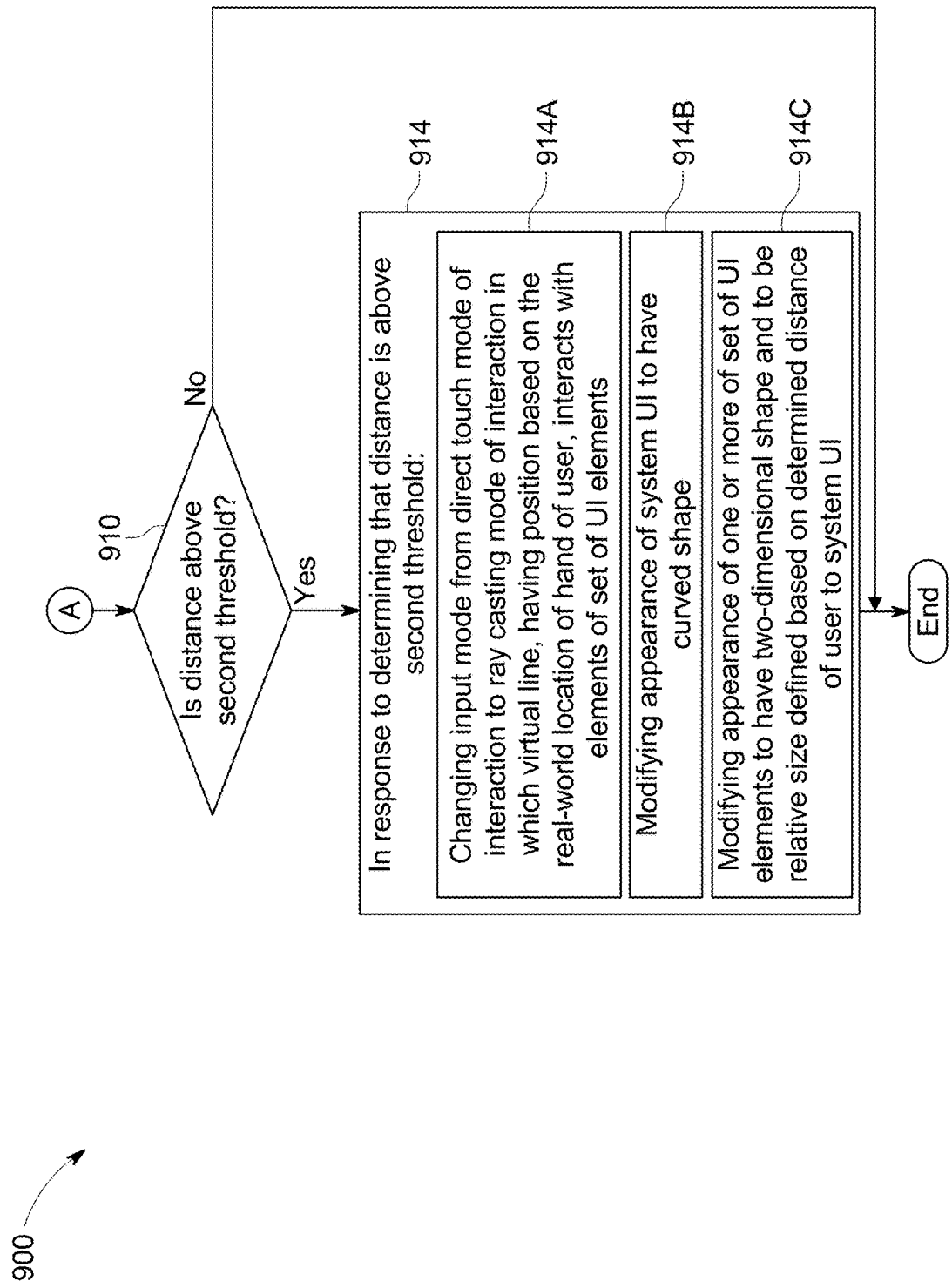
FIG. 9B is a flow diagram of a method used in some implementations for switching the input mode of the system UI and modifying an appearance of the system UI.

FIGS. 9A and 9B show a flow diagram of a method 900 used in some implementations for switching the input mode of the system UI 508 and modifying the appearance of the system UI 508. In an implementation, the method 900 may be performed when a user enters an artificial reality environment, e.g., upon donning an XR device 506. Once the XR device 506 is activated by the user 504, the computing system may display the XR environment 502A on the XR device 506. Moreover, the computing system may receive an input from the user 504 to render the system UI 508 in the XR environment 502A.

At block 902, the system UI 508 is rendered as the 3D virtual element in the XR environment 502A. For instance, the system UI 508 may be rendered at a position in the XR environment 502A that is in front of the eye level of the user 504 at a preset default position, at a position defined by the user 504, etc. The system UI 508 comprises the set of UI elements 510 arranged on the surface of the system UI 508. The position of the rendered system UI 508 can be set to a preset default position inbuilt in the XR device 506 and/or at the position defined by the user 504. The position of the system UI 508 can be set such that it is within arms-reach of the user 504.

At block 904, based on the tracked position of the user 504, the distance is determined between the user 504 and the system UI 508. The tracking may be performed based on the positional data that is acquired using the one or more sensors (e.g., cameras, motion sensors, infrared sensors, etc.) present on or in communication with the XR device 506. For example, the one or more sensors may include imaging devices, such as cameras. Moreover, the tracking may be performed by use of the controllers 270. In some implementations, the tracking may be based on or more kinematic models that defines possible movements of a user's body, allowing a machine learning model that receive input based on images of the user to use the kinematic model as constraints for possible positions of various parts of the user's body. In some cases, the machine learning model can use past known positions of parts of the user's body as input to perform time-based predictions of the user's movements. In some cases, image-based user tracking can be supplemented by or replaced with other forms of tracking, such as tracking based on wearables that sense motions of parts of the user's body. As additional sensor data is accumulated, the position of the representation 602 of the hand 504A (or the controller) and the position of the stable point on the user is updated based on the tracking. In an implementation, the distance between the user 504 and the system UI 508, is determined based on the distance between the hand 504A of the user 504 and the surface of the system UI 508.

At block 906, the computing system can determine if the distance is below the first threshold 702 (e.g., inside the distance of the determined typical arm length or the determined length of the arm of the user 504). For example, the computing system determines the distance, when a movement of the hand 504A of the user 504 is detected. In response to determining that the distance is below the first threshold 702, further steps are performed which are explained at block 908 (further divided in sub-steps 908A, 908B and 908C).

At block 908A, when the distance between the user 504 and the system UI 508 is below the first threshold 702, the computing system is configured to change the input mode from the ray casting mode of interaction to the direct touch mode of interaction. In the direct touch mode of interaction, based on the tracked real-world location of the hand 504A of the user 504, the representation 602 of the hand 504A of the user 504 interacts with the UI elements of the set of UI elements 510.

At block 908B, the computing system is configured to modify the appearance of the system UI 508 to have the flat shape. For example, the edge of the system UI 508 may be flat such that a display of the system UI 508 appears to be flat. In an implementation, in the direct touch mode of interaction, the system UI 508 having the flat shape comprises the single screen display which can be grabbed and moved by the user. As the system UI 508 is close to the user 504 (and may be held by another hand of the user) in the direct touch mode of interaction, viewing the single screen display may provide a comfortable viewing experience to the user 504.

At block 908C, the computing system is configured to modify the appearance of one or more of the set of UI elements 510 to have the 3D shape and to be the fixed size defined for each of the one or more of the set of UI elements 510. The 3D shape may enable the set of UI elements 510 to be at a height from the surface of the system UI 508. The set of UI elements 510 may be shown in the 3D shape such that the user 504 may easily identify which UI element to target. Moreover, the size of the set of UI elements 510 may be fixed, and in some embodiments, the size of the selected UI element may be increased.

At block 910, based on the determination that the distance is above the first threshold 702, the computing system is configured to determine if the distance is above the second threshold 710. For example, the determination of the distance above the second threshold 710 may also be based on the determined length of the typical arm or the determined length of the arm of the user 504. In response to determining that the distance is not above the second threshold, process 900 can end. Process 900 can be performed again iteratively, e.g., as the user moves and as the system UI continues to be displayed.

At block 914A, when the distance between the user 504 and the system UI 508, is above the second threshold 710, the computing system is configured to change the input mode from the direct touch mode of interaction to the ray casting mode of interaction. In the ray casting mode of interaction, the virtual line 708 having a position based on the real-world location of the hand 504A of the user 504, interacts with the UI elements of the set of UI elements 510. The virtual line 708 may be a ray emerging from the representation 706 of the user's hand or the controller. The virtual line 708 may be used as a reference by the user 504 to interact with the set of UI elements 510. For example, the virtual line 708 may be used to interact with the UI element 712 of the set of UI elements 510.

At block 914B, the computing system is configured to modify the appearance of the system UI 508 to have the curved shape. For example, the edge of the system UI 508 may be curved such that the display of the system UI 508 appears to be curved as well. Thus, in the ray casting mode of interaction, the computing system provides the user 504 an experience of interacting with the system UI 508 from a faraway distance. In an implementation, the system UI 508 having the curved shape comprises a multi-screen display, for example, the display 714A and the display 714B. Notably, by use of the multi-screen display on the system UI 508, the user 504 may be able to utilize various applications at once without having to switch repeatedly between windows.

At block 914C, the computing system is configured to modify the appearance of one or more of the set of UI elements 510 to have to have the 2D (yet curved along the curved system UI surface) shape and to be a relative size defined based on the determined distance of the user 504 to the system UI 508. For example, the UI elements closer to the user 504 on the system UI 508 may appear smaller as compared to the UI elements far from the user 504 on the system UI 508 having the curved shape. This relationship can be based on a defined relationship (e.g., linear and can have a defined maximum) that takes the distance and provides a magnification value. Thus, based on the distance between the user 504 and the system UI 508, the computing system enables switching of the input modes and the display mode of the system UI 508, without causing flickering, thereby providing an enhanced user experience to the user 504.

The method 900 may be implemented using corresponding processor of the computing system. In some implementations, a computer programmable product may be provided. The computer programmable product may comprise at least one non-transitory computer-readable storage medium having stored thereon computer-executable program code instructions that when executed by a computer, cause the computer to execute the method 900.

Figure 10:
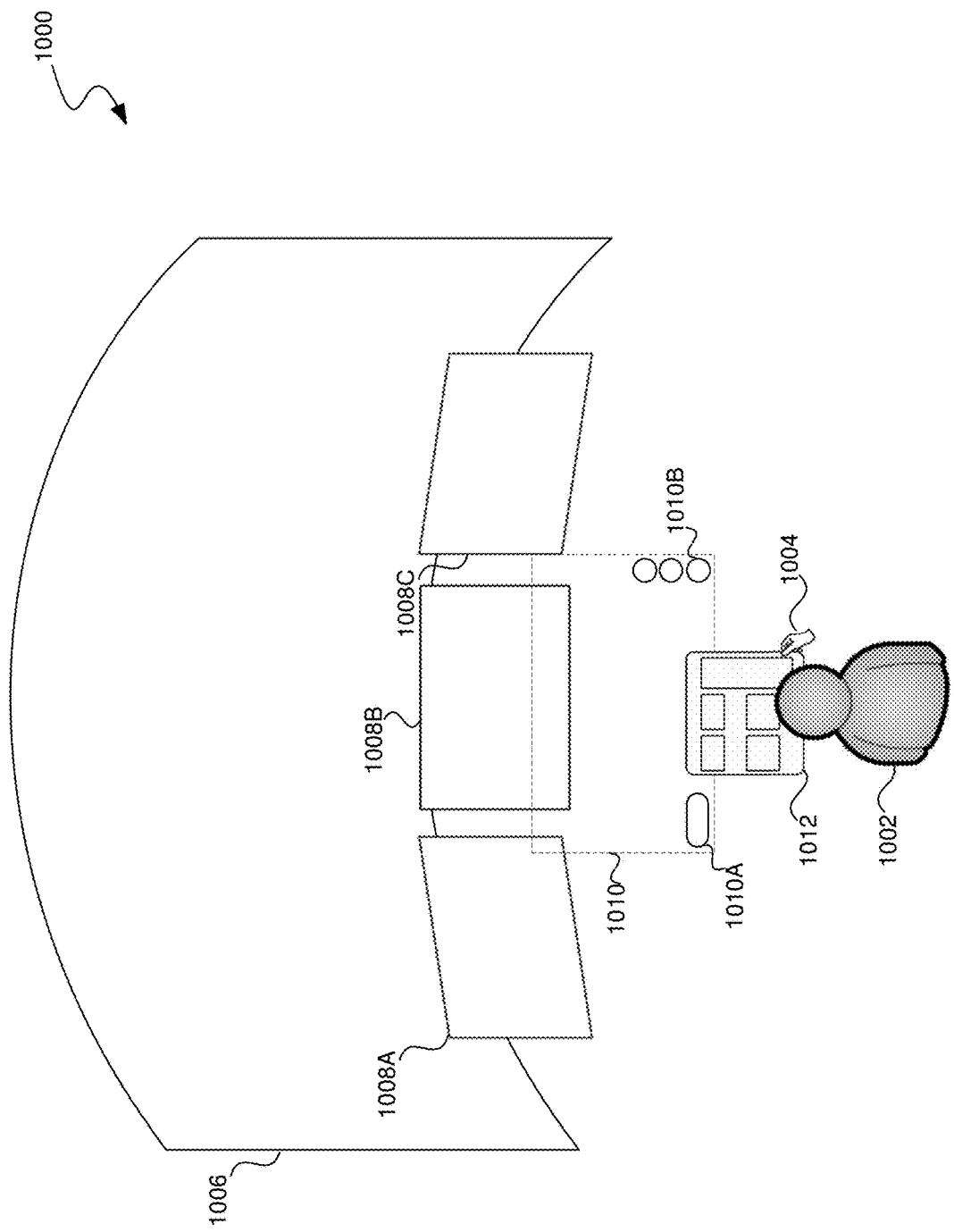
FIG. 10 is a conceptual diagram illustrating various implementations and configurations of the system UI.

FIG. 10 is a conceptual diagram 1000 illustrating various implementations and configurations of the system UI. FIG. 10 includes four versions of the system UI. Version 1012 includes the system UI being displayed as a handheld virtual object that the user 1002 can hold with one hand 1004 and interact with the other. Additional details on system UI version 1012 are provided below in relation to FIG. 11A. Version 1010 includes the system UI being displayed as a set of separate UI elements and controls, such as elements and controls 1010A and 1010B, that are locked in place around a user 1002's field of view. Additional details on system UI version 1010 are provided below in relation to FIG. 11B. Version 1008 includes the system UI being displayed as a set of multiple windows 1008A-1008C, enabling multitasking and simultaneous access to multiple applications or information sources. Additional details on system UI version 1008 are provided below in relation to FIG. 11C. Version 1006 includes the system UI being displayed as a large head-locked or world-locked screen, providing an immersive content viewing experience. Additional details on system UI version 1006 are provided below in relation to FIG. 11D.

FIGS. 11A-11D are conceptual diagrams 1100, 1110, 1120, and 1130, each further illustrating one of the various implementations and configurations of the system UI. In various implementations, the system UI configurations shown in conceptual diagrams 1100, 1110, 1120, and 1130 can be mapped to be used as a user is identified as being in various contexts—such as VR immersive applications, mixed reality or augmented reality experiences, in a specified home environment, situations specified as needing certain screen size interfaces, occlusion parameters, or user input modalities. For example, the heads-up configuration, where the system UI is displayed as a set of separate UI elements and controls locked in place around a user's field of view, can be used in a context defined for the user to need both hands free or have limited attention for system controls and thus is in need of glanceable info; the tablet configuration, where the system UI is displayed as a handheld virtual object that the user can hold with one hand and interact with the other, can be used as the default mode; the multi-screen configuration, where the system UI is displayed as a set of multiple windows, can be used in a context where the user may be multitasking; and the theater screen configuration, where the system UI is displayed as a large head-locked or world-locked screen, can be used in a context where the user is viewing content items such as a movie or immersive media.

Figure 11A:
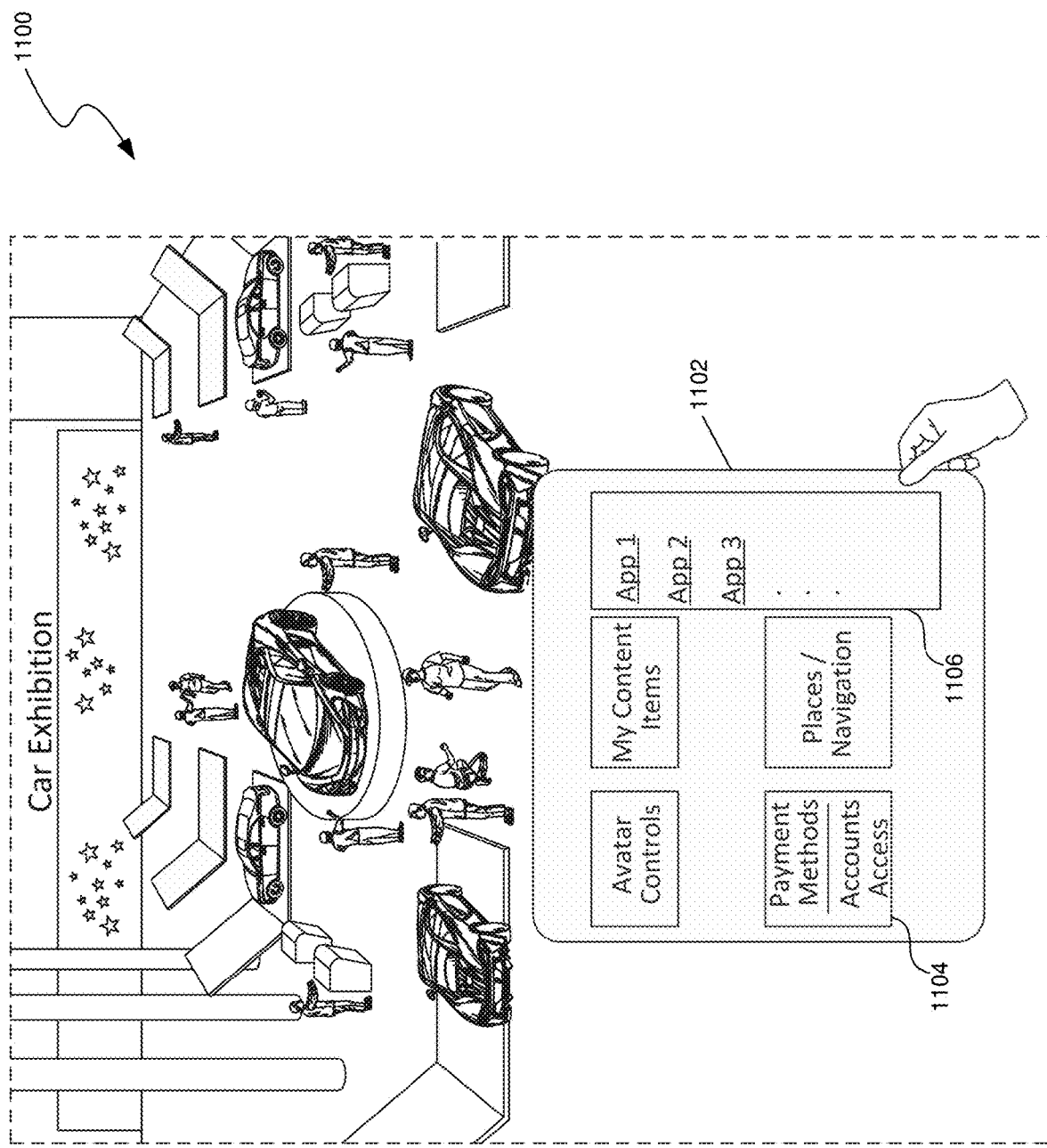
FIGS. 11A-11D are conceptual diagrams each further illustrating one of the various implementations and configurations of the system UI.

FIG. 11A illustrates the system UI 1102 being displayed as a handheld virtual object that the user can hold with one hand and interact with, with the other hand. The system UI configuration shown in FIG. 11A can be triggered when the user first enables the system UI, when the user performs a gesture to grab a portion of the system UI shown in a different configuration, upon a voice command or UI element activation to enter this system UI mode, etc. The system UI in this configuration can include various system controls, access to applications (e.g., area 1106), tools and utilities such as accounts and payment methods (e.g., area 1104), links to travel to various metaverse destinations, the user's content items, controls to move and set the look and accessories of the user's avatar, etc. The user can hold this system UI 1102 by making a grab gesture with the user's physical hand, which allows the user to move the system UI 1102 in six-degrees of freedom and position it in a manner that facilitates easy viewing and interaction with the user's other hand. If the user lets go of the system UI 1102, in various implementations, it may disappear, become world locked at the location it was released, move to a default location, or transition into another state such as one of the states shown in FIGS. 11B-11D.

Figure 11B:
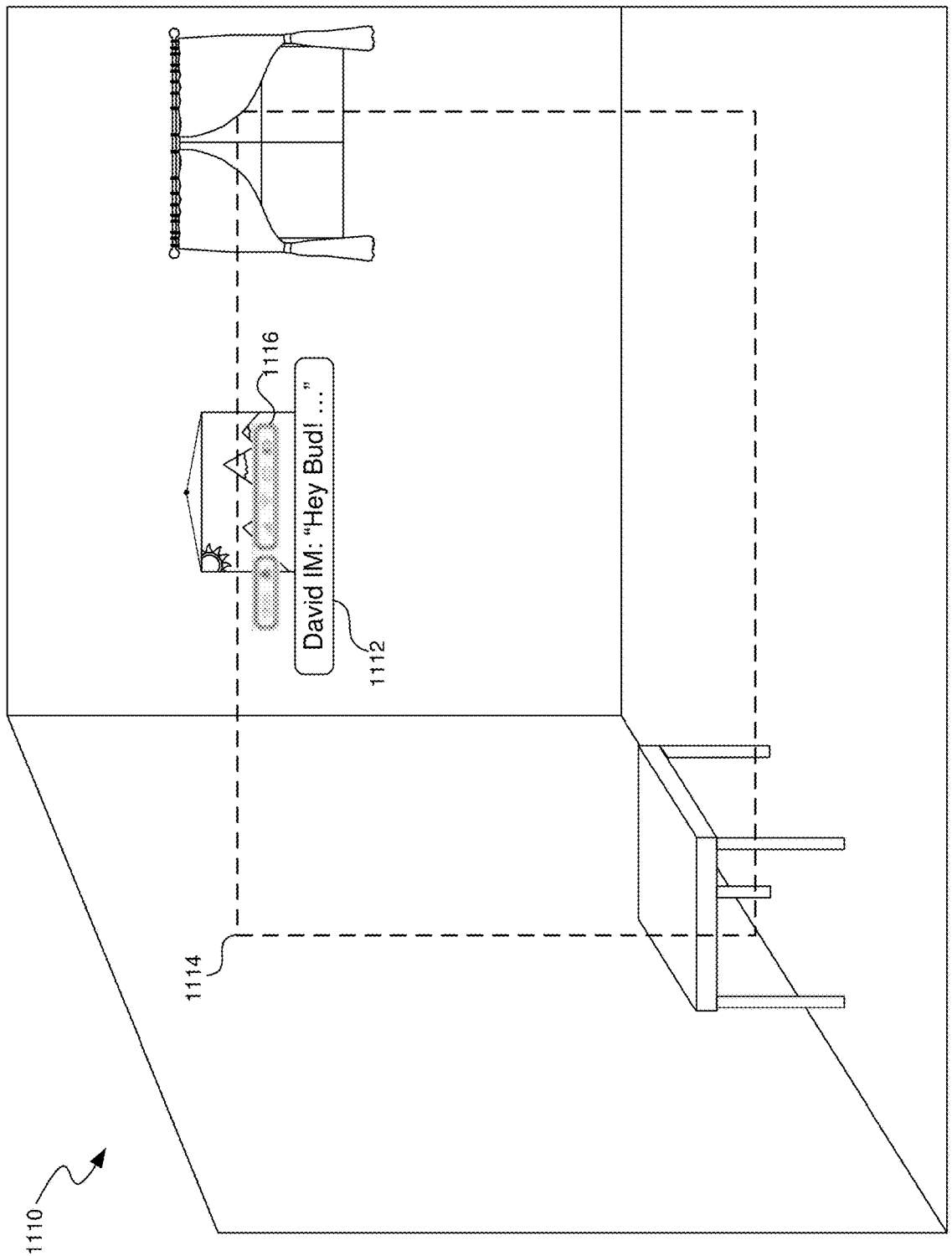

FIG. 11B includes the system UI being displayed as a set of separate UI elements and controls that are locked in place around a user field of view. The system UI configuration shown in FIG. 11B can be triggered when the user first enables the system UI, when the user closes the system UI from another of the modes shown in FIG. 11A, 11C, or 11D, upon a voice command or UI element activation to enter this system UI mode, etc. In FIG. 11B, the user's field of view (i.e., the area of the real or virtual world that the user can see through her artificial reality device) is illustrated as rectangle 1114. In the example shown, the system UI has been split into several UI elements including system controls 1116 and notifications 1112. The system UI in this configuration can pop up additional UI elements that can be locked to a particular area in the user's field of view as they are surfaced by the system controller or other executing applications The system UI can revert to another of the system UI modes when one of them are activated as discussed herein.

Figure 11C:

FIG. 11C includes the system UI being displayed as a set of multiple windows 1122-1126, enabling multitasking and simultaneous access to multiple applications or information sources. The system UI configuration shown in FIG. 11C can be triggered when the user first enables the system UI, when the user performs a gesture such as throwing the tablet version of the system UI or stretching the tablet version of the system UI with an opening all five fingers gesture or a two-handed pull apart gesture, upon a voice command or UI element activation to enter this system UI mode, etc. The system UI in this configuration can show multiple windows where the user can select what to show in each such as a web browser or 2D version of another other application (e.g., window 1126), content items such as a document, video, or image or libraries of such content items, a list of contacts or other social media content (e.g., window 1122), news feeds, installed applications (e.g., window 1124), controls to navigate to various metaverse destinations, avatar setup and controls, etc. In some implementations, this configuration of the system UI can also include a launcher bar 1128, e.g., with quick access controls, settings, system status and notifications controls, etc. The system UI can close or transition to another of the configurations shown in FIG. 11A, 11B, or 11D upon a user command or gesture to do so.

Figure 11D:
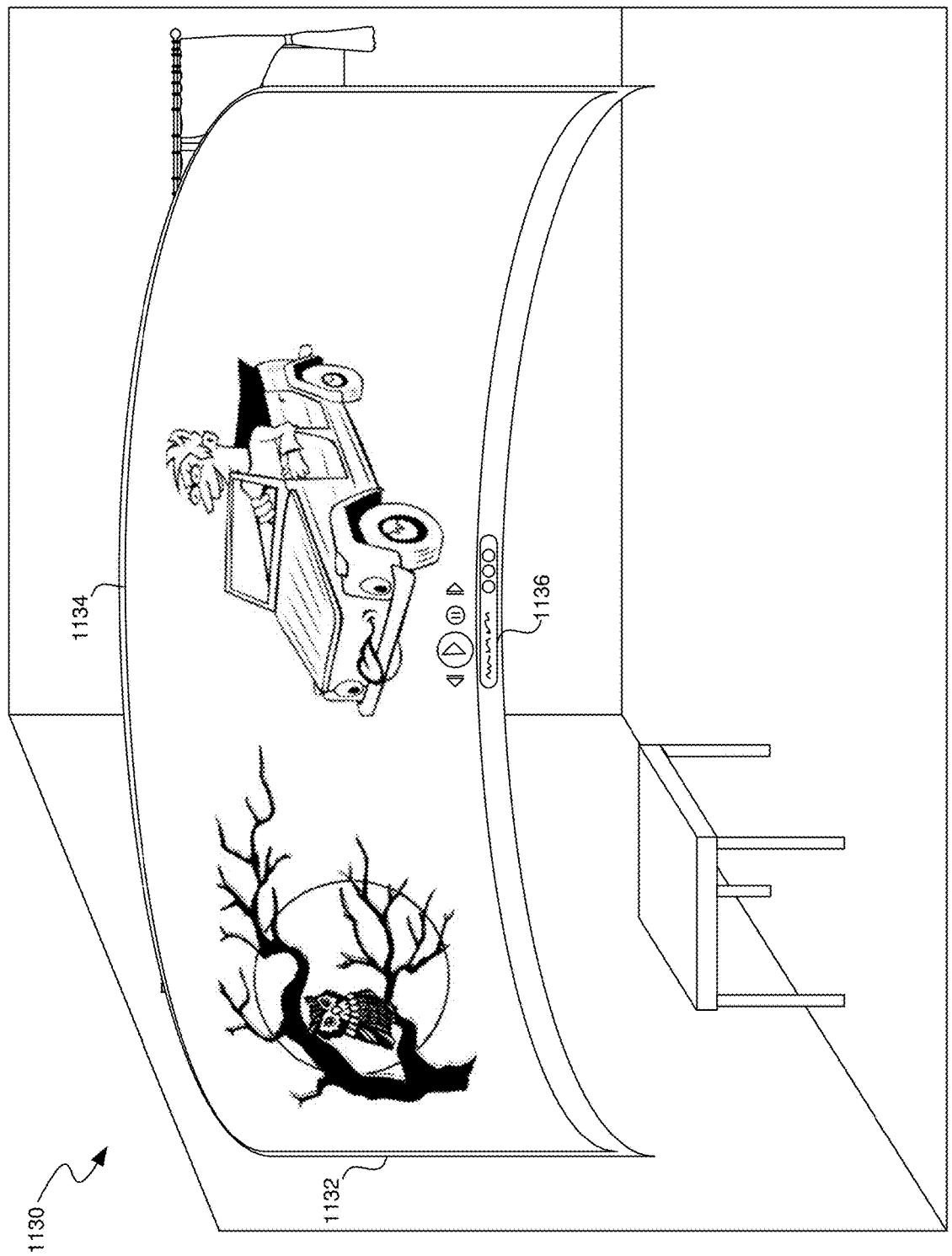

FIG. 11D includes the system UI being displayed as a large head-locked or world-locked screen, providing an immersive content viewing experience. The system UI configuration shown in FIG. 11D can be triggered when the user first enables the system UI, when the user opens a content item in the system UI configured for this mode, starts an application or experience setup to provide content items via the system UI in this mode, upon a user gesture to throw the system UI or further stretch the system UI above a threshold size (e.g., by stretching another version of the system UI with an opening all five fingers gesture or a two-handed pull apart gesture above a threshold size), upon a voice command or UI element activation to enter this system UI mode, etc. The system UI in this configuration can provide a fully immersive experience showing a content item or can show a large virtual screen, such as screen 1132, showing a content item 1134. In some implementations, the system UI in this configuration can include additional system UI elements 1136 such as system controls, notifications, co-watching elements, etc. The system UI in this configuration can be world locked so it appears to stay in the same place as the user moves about the world (which may include keeping the screen facing the user) or can be body locked so it appears to stay the same distance from the user as the user moves about the world. The system UI from this configuration can close or transition to another of the system UI configurations e.g., when selected by the user with a grab gesture, in response to a command to close with a voice or UI activation, etc.

Several implementations of the disclosed technology are described above in reference to the figures. The computing devices on which the described technology may be implemented can include one or more central processing units, memory, input devices (e.g., keyboard and pointing devices), output devices (e.g., display devices), storage devices (e.g., disk drives), and network devices (e.g., network interfaces). The memory and storage devices are computer-readable storage media that can store instructions that implement at least portions of the described technology. In addition, the data structures and message structures can be stored or transmitted via a data transmission medium, such as a signal on a communications link. Various communications links can be used, such as the Internet, a local area network, a wide area network, or a point-to-point dial-up connection. Thus, computer-readable media can comprise computer-readable storage media (e.g., "non-transitory" media) and computer-readable transmission media.

Reference in this specification to "implementations" (e.g. "some implementations," "various implementations," "one implementation," "an implementation," etc.) means that a particular feature, structure, or characteristic described in connection with the implementation is included in at least one implementation of the disclosure. The appearances of these phrases in various places in the specification are not necessarily all referring to the same implementation, nor are separate or alternative implementations mutually exclusive of other implementations. Moreover, various features are described which may be exhibited by some implementations and not by others. Similarly, various requirements are described which may be requirements for some implementations but not for other implementations.

As used herein, being above a threshold means that a value for an item under comparison is above a specified other value, that an item under comparison is among a certain specified number of items with the largest value, or that an item under comparison has a value within a specified top percentage value. As used herein, being below a threshold means that a value for an item under comparison is below a specified other value, that an item under comparison is among a certain specified number of items with the smallest value, or that an item under comparison has a value within a specified bottom percentage value. As used herein, being within a threshold means that a value for an item under comparison is between two specified other values, that an item under comparison is among a middle specified number of items, or that an item under comparison has a value within a middle specified percentage range. Relative terms, such as high or unimportant, when not otherwise defined, can be understood as assigning a value and determining how that value compares to an established threshold. For example, the phrase "selecting a fast connection" can be understood to mean selecting a connection that has a value assigned corresponding to its connection speed that is above a threshold.

As used herein, the word "or" refers to any possible permutation of a set of items. For example, the phrase "A, B, or C" refers to at least one of A, B, C, or any combination thereof, such as any of: A; B; C; A and B; A and C; B and C; A, B, and C; or multiple of any item such as A and A; B, B, and C; A, A, B, C, and C; etc.

Although the subject matter has been described in language specific to structural features and/or methodological acts, it is to be understood that the subject matter defined in the appended claims is not necessarily limited to the specific features or acts described above. Specific embodiments and implementations have been described herein for purposes of illustration, but various modifications can be made without deviating from the scope of the embodiments and implementations. The specific features and acts described above are disclosed as example forms of implementing the claims that follow. Accordingly, the embodiments and implementations are not limited except as by the appended claims.

Any patents, patent applications, and other references noted above are incorporated herein by reference. Aspects can be modified, if necessary, to employ the systems, functions, and concepts of the various references described above to provide yet further implementations. If statements or subject matter in a document incorporated by reference conflicts with statements or subject matter of this application, then this application shall control.

We claim:

1. A computer implemented method for facilitating system user interface (UI) interactions in an artificial reality (XR) environment, the computer implemented method comprising:
   rendering the system UI as a 3D virtual element in the XR environment, wherein the system UI comprises a set of UI elements arranged on a surface of the system UI;
   tracking a position of a hand of a user and a pre-defined stable point on the user,
      wherein the pre-defined stable point is a point offset from a defined body point on the user, and
      wherein a direction and amount of the offset are based on a determination of a relative position of the system UI with respect to an eye level of the user; and
   identifying, based on the tracking, that the hand has grasped a portion of the system UI and, in response, rotating the position of the system UI around the grasped portion of the system UI such that a line, between the pre-defined stable point and the surface of the system UI, is moved, to be perpendicular or at a predefined angle from perpendicular to the surface of the system UI, as the user moves the system UI via the grasped portion.

2. The computer implemented method of claim 1, wherein the pre-defined stable point on the user is a point where a base of the user's head meets the user's neck.

3. The computer implemented method of claim 1, wherein the defined body point is where a base of the user's head meets the user's neck.

4. The computer implemented method of claim 1, wherein the position of the system UI is rotated around the grasped portion of the system UI such that a speed of rotation of the position of the system UI is less than a threshold speed.

5. The computer implemented method of claim 1, further comprising:
   determining that the system UI is moved, via the grasped portion, more than or equal to a threshold amount; and
   wherein the rotating the position of the system UI is further in response to the determination that the system UI is moved more than or equal to the threshold amount.

6. The computer implemented method of claim 1, wherein the rotation includes rotating the system UI to have the line be at the predefined angle from perpendicular to the surface of the system UI, wherein the predefined angle is selected based on a determination that the position of the system UI is less than a threshold height, and wherein the threshold height is relative to the eye level of the user.

7. A non-transitory computer-readable storage medium storing instructions that, when executed by a computing system, cause the computing system to perform a process for facilitating system user interface (UI) interactions in an artificial reality (XR) environment, the process comprising:
   rendering the system UI as a 3D virtual element in the XR environment, wherein the system UI comprises a set of UI elements arranged on a surface of the system UI;
   tracking a position of a hand of a user and a pre-defined stable point on the user,
      wherein the pre-defined stable point is a point offset from a defined body point on the user, and
      wherein a direction and amount of the offset are based on a determination of a relative position of the system UI with respect to an eye level of the user; and identifying, based on the tracking, that the hand has grasped a portion of the system UI and, in response, rotating the position of the system UI around the grasped portion of the system UI such that a line, between the pre-defined stable point and the surface of the system UI, is moved, to be perpendicular or at a predefined angle from perpendicular to the surface of the system UI, as the user moves the system UI via the grasped portion.

8. The non-transitory computer-readable storage medium of claim 7, wherein the pre-defined stable point on the user is a point where a base of the user's head meets the user's neck.

9. The non-transitory computer-readable storage medium of claim 7, wherein the defined body point is where a base of the user's head meets the user's neck.

10. The non-transitory computer-readable storage medium of claim 7, wherein the position of the system UI is rotated around the grasped portion of the system UI such that a speed of rotation of the position of the system UI is less than a threshold speed.

11. The non-transitory computer-readable storage medium of claim 7, wherein the process further comprises:
determining that the system UI is moved, via the grasped portion, more than or equal to a threshold amount; and
wherein the rotating the position of the system UI is further in response to the determination that the system UI is moved more than or equal to the threshold amount.

12. A computing system for interacting with a system user interface (UI) in an artificial reality (XR) environment, the computing system comprising:
one or more processors; and
one or more memories storing instructions that, when executed by the one or more processors, cause the computing system to perform a process comprising:
rendering the system UI as a 3D virtual element in the XR environment, wherein the system UI comprises a set of UI elements arranged on a surface of the system UI;
tracking a position of a hand of a user and a pre-defined stable point on the user,
wherein the pre-defined stable point is a point offset from a defined body point on the user, and
wherein a direction and amount of the offset are based on a determination of a relative position of the system UI with respect to an eye level of the user; and
identifying, based on the tracking, that the hand has grasped a portion of the system UI and, in response, rotating the position of the system UI such that a line, between the pre-defined stable point and the surface of the system UI, is moved, to be perpendicular or at a predefined angle from perpendicular to the surface of the system UI, as the user moves the system UI.

13. The computing system of claim 12, wherein the pre-defined stable point on the user is a point where a base of the user's head meets the user's neck.

14. The computing system of claim 12, wherein the defined body point is where a base of the user's head meets the user's neck.

15. The computing system of claim 12, wherein the position of the system UI is rotated around the grasped portion of the system UI such that a speed of rotation of the position of the system UI is less than a threshold speed.

16. The computing system of claim 12, wherein the process further comprises:
determining that the system UI is moved, via the grasped portion, more than or equal to a threshold amount; and
wherein the rotating the position of the system UI is further in response to the determination that the system UI is moved more than or equal to the threshold amount.

17. The computing system of claim 12, wherein the rotation includes rotating the system UI to have the line be at the predefined angle from perpendicular to the surface of the system UI, wherein the process further comprises selecting the predefined angle based on a determination that the position of the system UI is less than a threshold height, and wherein the threshold height is relative to the eye level of the user.

* * * * *